(12) United States Patent
Higuchi et al.

(10) Patent No.: US 7,538,280 B2
(45) Date of Patent: May 26, 2009

(54) COMBINATION WEIGHER

(75) Inventors: Hiroshi Higuchi, Takasago (JP); Shozo Kawanishi, Nishinomiya (JP); Taketoshi Okamura, Ashiya (JP)

(73) Assignee: Yamato Scale Co., Ltd., Akashi-shi (JP)

( * ) Notice: Subject to any disclaimer, the term of this patent is extended or adjusted under 35 U.S.C. 154(b) by 0 days.

(21) Appl. No.: 11/813,422

(22) PCT Filed: Dec. 27, 2005

(86) PCT No.: PCT/JP2005/023885

§ 371 (c)(1),
(2), (4) Date: Dec. 5, 2007

(87) PCT Pub. No.: WO2006/073087

PCT Pub. Date: Jul. 13, 2006

(65) Prior Publication Data

US 2008/0093129 A1    Apr. 24, 2008

(30) Foreign Application Priority Data

Jan. 6, 2005    (JP) .............................. 2005-001069

(51) Int. Cl.
    *G01G 19/387* (2006.01)
(52) U.S. Cl. .................................. 177/25.18
(58) Field of Classification Search ............ 177/25.18
    See application file for complete search history.

(56) References Cited

U.S. PATENT DOCUMENTS 4,753,306 A  *  6/1988  Mosher .................... 177/25.19

FOREIGN PATENT DOCUMENTS

| JP | 60-151530 | 8/1985 |
|---|---|---|
| JP | 60-155914 | 8/1985 |
| JP | 62-091819 | 4/1987 |
| JP | 64-12229 | 1/1989 |
| JP | 4-204330 | 7/1992 |
| JP | 08-152353 | 6/1996 |

OTHER PUBLICATIONS

International Search Report for PCT/JP2005/023885, dated Jan. 19, 2006.

* cited by examiner

*Primary Examiner*—Randy W Gibson
(74) *Attorney, Agent, or Firm*—Marshall, Gerstein & Borun LLP

(57) ABSTRACT

A combination weigher of the present invention is configured such that a plurality of weighing hoppers (4) are divided into base groups (FG1, FG2) and adjustment groups (CG1, CG2) between them, collecting funnels (7A, 7B) are provided at a lower part of a collecting chute (6), and movable plates (10) are provided to selectively discharge the objects to weighed from each adjustment group (CG1, CG2) to one of the collecting funnels (7A, 7B). A control unit (20) is configured to combine each adjustment group with either one of the base groups to create discharge groups each including one base group and made up of the weighing hoppers (4) arranged continuously and to perform combination calculation to determine weighing hoppers (4) forming an optimal combination in each discharge group, and configured to cause the movable plate (10) to move according to the discharge group to which each discharge group belongs and to cause the weighing hoppers (4) forming the optimal combination to discharge the objects to be weighed.

28 Claims, 16 Drawing Sheets

US 7,538,280 B2

COMBINATION WEIGHER

TECHNICAL FIELD

The present invention relates to a combination weigher which feeds objects to be weighed to a packaging machine or the like.

BACKGROUND ART

One conventional example of a combination weigher which is coupled to two packaging machines or a twin type packaging machine, is shown in FIG. 18.

FIG. 18(a) is a schematic cross-sectional view of the conventional combination weigher as viewed from a lateral side, and FIG. 18(b) is a schematic view of weighing hoppers and collecting chutes of the combination weigher as viewed from above.

The conventional combination weigher is constructed in such a manner that a dispersion feeder 1 of a conical shape is mounted to an upper portion of a center base body 9 to radially disperse objects to be weighed supplied from an external supplying device by vibration and linear feeders 2 are disposed around the dispersion feeder 1 to transfer the objects to be weighed sent from the dispersion feeder 1 into respective feeding hoppers 3 by vibration. A plurality of feeding hoppers 3 and weighing hoppers 4 are disposed below the linear feeders 2 and are arranged circularly around the center base body 9 in such a manner that each feeding hopper 3 and each weighing hopper 4 correspond to the associated one of the linear feeders 2. Each weighing hopper 4 is attached with a weight sensor 41 which measures weight of objects to be weighed inside the weighing hopper 4. Two collecting chutes 6A and 6B are disposed below the weighing hoppers 4 to gather the objects to be weighed discharged from the weighing hoppers 4 and to discharge the objects to be weighed from outlets 6a and 6b. For example, two packaging machines are disposed below the combination weigher. The objects to be weighed discharged from the outlets 6a and 6b are fed into inlets of the packaging machines.

A control unit 80 controls an operation of the entire combination weigher. The control unit 80 performs combination calculation based on measured values of the weighing hoppers 4 (values measured by the weight sensors 41) making up of a group G1 disposed above to correspond to the collecting chute 6A, and performs combination calculation based on measured values of the weighing hoppers 4 (values measured by the weight sensors 41) making up of a group G2 disposed above to correspond to the collecting chute 6B, to select in each of the groups G1 and G2, weighing hoppers 4 forming an optimal combination whose total measured value of the weighing hoppers 4 falls within an allowable range with respect to a target weight and to cause the selected weighing hoppers 4 to discharge the objects to be weighed. The objects to be weighed discharged from the weighing hoppers 4 in the group G1 are gathered by the collating chute 6A and are discharged from the outlet 6a, while the objects to be weighed discharged from the weighing hoppers 4 in the group G2 are gathered by the collecting chute 6B and are discharged from the outlet 6b.

Patent document 1: Japanese Laid-Open Patent Application Publication No. Sho 60-161530
Patent document 2: Japanese Laid-Open Patent Application Publication No. Hei 4-204330
Patent document 3: Japanese Laid-Open Patent Application Publication No. Sho 64-12229

Patent Document 4: Japanese Examined Patent Application Publication No. Hei. 3-61895

DISCLOSURE OF THE INVENTION

Problems to be Solved by the Invention

It is well known that combinations increase in number and weighing precision is improved as the number of weighing hoppers 4 (number of measured values used in combination calculation) increases. However, in the above described conventional combination weigher, the combination calculation must be performed with respect to each of the fixed groups G1 and G2 to select the weighing hoppers 4 forming the optimal combination under the condition in which the total number of the weighing hoppers 4 is fixed, limiting improvement of the weighing precision.

The present invention has been developed to solve the above described problem, and an object of the present invention is to provide a combination weigher having a plurality of outlets for discharging objects to be weighed based on combination calculation results, which is capable of improving weighing precision.

Means for Solving the Problems

To achieve the above described object, a combination weigher comprises: a plurality of base groups and one or more adjustment groups into which a combination hopper chamber line formed by combination hopper chambers arranged in a line shape and fed with objects to be weighed is divided, each of the plurality of base groups being made up of a plurality of combination hopper chambers and the one or more adjustment groups being disposed between adjacent base groups and being made up of one or a plurality of combination hopper chambers; a discharge path switching chute which is disposed below the base groups and the adjustment groups and is provided at a lower part thereof with a plurality of outlets respectively corresponding to the base groups, the discharge path switching chute being configured to gather the objects to be weighed discharged from the combination hopper chambers of at least the base group corresponding to each outlet and to discharge the objects to be weighed from each outlet, and configured to switch a discharge path of the objects to be weighed discharged from the combination hopper chamber of each adjustment group so that the objects to be weighed discharged from the combination hopper chamber in each adjustment group are discharged selectively from one of the two outlets respectively corresponding to two base groups disposed at both sides of each adjustment group; and a control means configured to perform: a combination process including combining each adjustment group with one of the base groups at both sides thereof to re-divide the base groups and the adjustment groups into a plurality of discharge groups each including one base group and made up of a plurality of combination hopper chambers arranged continuously and performing combination calculation based on weights of the objects to be weighed fed into the combination hopper chambers in each discharge group to determine combination hopper chambers forming a combination in which a total weight of the objects to be weighed falls within an allowable range with respect to a target weight and a difference with respect to the target weight is smallest; a discharge path switching process for controlling the discharge path switching chute so that the objects to be weighed discharged from the combination hopper chambers of each adjustment group are discharged from the outlet corresponding to the base group included in the discharge group to which the adjustment group belongs; and a discharge process for causing the combination hopper chambers forming the combination determined in each discharge group to discharge the objects to be weighed.

In accordance with this configuration, since the discharge path of the objects to be weighed discharged from each adjustment group is switched so that the objects to be weighed discharged from each adjustment group are discharged selectively from one of the two outlets respectively corresponding to the base groups disposed at both sides thereof and each discharge group is created by combining each adjustment group with either one of the base groups located at both sides thereof, one set of a plurality of discharge groups are selected from plural candidate sets. Therefore, in contrast to the conventional example in which there is no adjustment group and combination hopper chambers making up of each discharge group are always the same, one candidate set of a plurality of candidate groups can be selected from plural candidate sets, and as a result, weighing precision of the combination in each discharge group can be improved as a whole, even in a configuration in which a total number of combination hopper chambers is fixed.

The combination process performed by the control means may be to repeat plural times a series of processes to calculate a total of differences in each of discharge candidate group sets in which at least two discharge candidate groups are different, the series of processes including: a first process for combining each adjustment group with one of the base groups at both sides thereof to re-divide the base groups and the adjustment groups into a plurality of discharge candidate groups each including one base group and made up of a plurality of combination hopper chambers arranged continuously to determine the plurality of discharge candidate groups as one discharge candidate group set; a second process performed with respect to each of the discharge candidate groups in each discharge candidate group set in such a manner that the combination calculation is performed based on weights of the objects to be weighed fed into combination hopper chambers in each discharge candidate group to determine combination hopper chambers forming the combination in which the total weight of the objects to be weighed falls within the allowable range with respect to the target weight and the difference with respect to the target weight is smallest, to determine the total weight of the objects to be weighed in the combination hopper chambers forming the combination as an optimal combination weight of the discharge candidate group; and a third process for calculating a total of differences between optimal combination weights of the discharge candidate groups in each discharge candidate group set and the target weight; and to select a discharge candidate group set with a smallest total difference, from the discharge candidate group sets, and to determine discharge candidate groups in the discharge candidate group set with the smallest total difference as the discharge groups.

In accordance with this configuration, as described above, the discharge path of the objects to be weighed discharged from each adjustment group is switched so that the objects to be weighed discharged from the adjustment group are discharged selectively from one of the two outlets respectively corresponding to the base groups disposed at both sides thereof, and one set of discharge groups are selected from a plurality of discharge candidate group sets created by combining each adjustment group with either one of the base groups at both sides thereof. Therefore, in contrast to the conventional example in which there is no adjustment group and combination hopper chambers making up of each discharge group are always the same, one set in which a total of differences between optimal combination weights and a target weight is smallest can be selected from plural discharge candidate group sets and the set is determined as a plurality of discharge groups, and as a result, weighing precision of the combination in each discharge group can be improved as a whole even in a configuration in which a total number of combination hopper chambers is fixed.

The number of the adjustment groups disposed between the base groups may be k (k: integer of one or more); wherein the first process in the combination process performed by the control means may be to combine with each base group m (m: one integer from 0 to k) adjustment group present on a side of a first line direction in which the combination hopper chambers are arranged, and to combine with each base group (k−m) adjustment group present on a side of a second line direction opposite to the first line direction, to re-divide the base groups and the adjustment groups into the discharge candidate groups; and wherein a value of m may be changed every time the series of processes including the first process is repeated.

The discharge path switching chute may include a collecting chute which is disposed below the base groups and the adjustment groups and is provided at a lower part thereof with a plurality of outlets respectively corresponding to the base groups, the collecting chute being configured to gather the objects to be weighed discharged from the combination hopper chambers of at least the base group corresponding to each outlet and to discharge the objects to be weighed from each outlet; and a movable plate which is configured to partition a space above the collecting chute to guide the objects to be weighed discharged from the combination hopper chambers of the adjustment group selectively to one of the two outlets respectively corresponding to the base groups at both sides of each adjustment group and is configured to be movable so that its partition position is changed; wherein the control means may be configured to control the movable plate to perform the discharge path switching process.

The discharge path switching chute may include: a collecting chute which is disposed below the base groups and the adjustment groups and is provided at a lower part thereof with a plurality of outlets respectively corresponding to the base groups, the collecting chute being configured to gather the objects to be weighed discharged from the combination hopper chambers of at least the base group corresponding to each outlet and to discharge the objects to be weighed from each outlet; and a movable chute which is disposed above the collecting chute and below the adjustment groups and is configured to receive the objects to be weighed discharged from the combination hopper chambers of the adjustment group from an opening at an upper part thereof and to discharge the objects to be weighed from a feed outlet at a lower end thereof, the movable chute being movable to cause each feed outlet to be directed toward one of the two outlets respectively corresponding to the base groups at both sides of each adjustment group; wherein the control means may be configured to control the movable chute to perform the discharge path switching process.

The discharge path switching chute may include: an upper chute which is disposed below the base groups and the adjustment groups and is configured to gather the objects to be weighed discharged from the combination hopper chambers and to feed out the objects to be weighed from an opening provided at a lower part thereof; a lower chute having a plurality of funnel regions which are respectively provided at lower parts thereof with outlets respectively corresponding to the base groups and are configured to receive the objects to be weighed discharged from the combination hopper chambers of at least the base group and fed out from the opening of the upper chute and to discharge the objects to be weighed from the outlets, the plurality of funnel regions being movable together in a direction in which the plurality of combination hopper chambers are arranged; and a guide plate configured to guide the objects to be weighed discharged from the combination hopper chambers of the adjustment group from above the upper chute to the funnel region provided with the outlet corresponding to the base group included in the discharge group to which the adjustment group belongs; wherein the control means may be configured to control the lower chute to perform the discharge path switching process.

In this configuration, the guide plate may be a separating plate which is fastened to the upper chute, for partitioning a region of the upper chute through which the objects to be weighed discharged from the combination hopper chambers of the adjustment group travel to guide the objects to be weighed discharged from the combination hopper chambers of the adjustment group to a predetermined region of the opening of the upper chute.

The guide plate may be a separating plate which is fastened onto a boundary between the funnel regions of the lower chute to extend from the boundary upward above the upper chute, the separating plate being movable with the funnel regions so as to move along a chute surface of the upper chute, thereby separating a traveling path inside the upper chute for the objects to be weighed discharged from the combination hopper chambers of each of adjacent discharge groups.

The combination hopper chambers may be weighing chambers of weighing hoppers each consisting of one weighing chamber fed with the objects to be weighed whose weight is measured.

Two combination hopper chamber lines may be arranged in upper and lower positions, wherein the combination hopper chambers in the upper combination hopper chamber line may be weighing chambers of each weighing hopper consisting of one weighing chamber fed with the objects to be weighed whose weight is measured, and the combination hopper chambers in the lower combination hopper chamber line may be accommodating chambers of each memory hopper which are provided to respectively correspond to the weighing chambers, the memory hoppers each consisting of one accommodating chamber fed with the objects to be weighed measured in the weighing chamber; wherein the weighing chambers may be each configured to discharge the objects to be weighed selectively to a corresponding accommodating chamber or to the discharge path switching chute; and wherein the adjustment group may be made up of one set or plural sets of corresponding weighing chamber and accommodating chamber.

Two combination hopper chamber lines may be arranged horizontally and the combination hopper chambers in the two combination hopper chamber lines may be disposed to form a pair; wherein the combination hopper chambers forming the pair in the two combination hopper chamber lines may be two accommodating chambers of each memory hopper having two accommodating chambers; and wherein a weighing chamber of a weighing hopper may be disposed above the two accommodating chambers of each memory hopper, the weighing hopper consisting of one weighing chamber which is fed with the objects to be weighed whose weight is measured and is configured to discharge the objects to be weighed selectively to one of the two accommodating chambers, and wherein the adjustment group may be made up of one set or plural sets of the two accommodating chambers of the memory hopper.

Two combination hopper chamber lines may be arranged horizontally, and the combination hopper chambers in the two combination hopper chamber lines may be disposed to form a pair; wherein the combination hopper chambers forming the pair in the two combination hopper chamber lines may be two weighing chambers of each weighing hopper having two weighing chambers fed with the objects to be weighed whose weights are measured; and wherein the adjustment group may be made up of one set or plural sets of the two weighing chambers of the weighing hopper.

Two combination hopper chamber lines may be arranged horizontally, and the combination hopper chambers in the two combination hopper chamber lines may be disposed to form a pair; wherein the combination hopper chambers forming the pair in the two combination hopper chamber lines may be two accommodating chambers of each memory hopper having two accommodating chambers; wherein two weighing chambers of each weighing hopper may be disposed above the two accommodating chambers of each memory hopper to respectively correspond to the accommodating chambers, the weighing hopper having two weighing chambers which are fed with the objects to be weighed whose weights are measured and are each configured to discharge the objects to be weighed to a corresponding accommodating chamber; and wherein the adjustment group may be made up of one set or plural sets of the two accommodating chambers of the memory hopper.

The combination hopper chamber line may be configured such that adjacent two combination hopper chambers form a pair, and the combination hopper chambers forming the pair may be two accommodating chambers of each memory hopper having two accommodating chambers; wherein a weighing chamber of a weighing hopper may be disposed above the two accommodating chambers of each memory hopper, the weighing hopper consisting of one weighing chamber which is fed with the objects to be weighed whose weight is measured and is configured to discharge the objects to be weighed selectively to one of the two accommodating chambers; and wherein the adjustment group may be made up of one accommodating chamber of the memory hopper.

The combination hopper chamber line may be configured such that adjacent two combination hopper chambers form a pair, and the combination hopper chambers forming the pair may be two weighing chambers of each weighing hopper having two weighing chambers which are fed with the objects to be weighed whose weights are measured; and wherein the adjustment group may be made up of one weighing chamber of the weighing hopper.

The combination hopper chamber line may be configured such that adjacent two combination hopper chambers form a pair, and the combination hopper chambers forming the pair may be two accommodating chambers of each memory hopper having two accommodating chambers; wherein two weighing chambers of a weighing hopper may be disposed above the two accommodating chambers of each memory hopper to respectively correspond to the accommodating chambers, the weighing hopper having two weighing chambers which are fed with the objects to be weighed whose weights are measured and are each configured to discharge the objects to be weighed to a corresponding accommodating chamber; and wherein the adjustment group may be made up of one accommodating chamber of the memory hopper.

Two combination hopper chamber lines may be arranged in upper and lower positions, wherein the combination hopper chambers in the upper combination hopper chamber line may be weighing chambers of each weighing hopper consisting of one weighing chamber fed with the objects to be weighed whose weight is measured, and the combination hopper chambers in the lower combination hopper chamber line may be accommodating chambers of each memory hopper which are provided to respectively correspond to the weighing chambers, the memory hoppers each consisting of one accommodating chamber fed with the objects to be weighed measured in the weighing chamber; wherein the weighing chambers may be each configured to discharge the objects to be weighed selectively to a corresponding accommodating chamber or to the discharge path switching chute; wherein the adjustment group may be made up of one set or plural sets of corresponding weighing chamber and accommodating chamber; wherein a plurality of feeding means are disposed above the weighing hoppers to respectively correspond to the weighing hoppers and are each configured to feed the objects to be weighed to a weighing chamber of a corresponding weighing hopper; wherein the plurality of feeding means may be each configured to feed the objects to be weighed only once to the weighing chamber of the corresponding weighing hopper in a time period from combination calculation in current combination process to combination calculation in next combination process when the control means repeats the combination process and the discharge process; and wherein the control means may be configured to find combination hopper chambers which are to be fed with the objects to be weighed and are to be used in combination calculation at a time point when the combination calculation in the next combination process is performed and to determine the discharge groups based on target weight and the number of combination hopper chambers for which the combination calculation is to be performed, after the discharge process, to thereafter perform the discharge path switching process according to the determined discharge groups before the combination calculation in the next combination process finishes and to perform the combination calculation in the next combination process with respect to each of the determined discharge groups.

In accordance with this configuration, as described above, in contrast to the conventional example in which there is no adjustment group and combination hopper chambers making up of each discharge group are always the same, one candidate set of a plurality of discharge groups can be selected from plural candidate sets, and as a result, weighing precision of the combination in each discharge group can be improved as a whole, even in a configuration in which a total number of combination hopper chambers is fixed. In this case, if a single chamber weighing hopper and a single chamber memory hopper form a pair and these two hopper chambers forming the pair are selected simultaneously to form a combination, then the accommodating chamber of the memory hopper has not been fed with the objects to be weighed at a time point of next combination calculation and cannot be used in the next combination calculation (cannot participate in the combination). So, by determining each discharge group based on the target weight and the number of combination hopper chambers which are to be used in the next combination calculation, after the discharge process, it becomes possible to improve weighing precision in the combination of each discharge group as a whole. For example, when the target weights are equal, the discharge groups are determined so that the number of combination hopper chambers which are included in each discharge group and are to be used in combination calculation is equal or substantially equal.

Two combination hopper chamber lines may be arranged horizontally and the combination hopper chambers in the two combination hopper chamber lines may be disposed to form a pair; wherein the combination hopper chambers forming the pair in the two combination hopper chamber lines may be two accommodating chambers of each memory hopper having two accommodating chambers; wherein a weighing chamber of a weighing hopper is disposed above the two accommodating chambers of each memory hopper, the weighing hopper consisting of one weighing chamber which is fed with the objects to be weighed whose weight is measured and is configured to discharge the objects to be weighed selectively to one of the two accommodating chambers; wherein the adjustment group may be made up of one set or plural sets of the two accommodating chambers of the memory hopper; wherein the weighing chamber of each weighing hopper may be configured to feed the objects to be weighed to one of the two accommodating chambers of the memory hopper in a time period from combination calculation in current combination process to combination calculation in next combination process when the control means repeats the combination process and the discharge process; and wherein the control means may be configured to find combination hopper chambers which are to be fed with the objects to be weighed and are to be used in combination calculation at a time point when the combination calculation in the next combination process is performed and to determine the discharge groups based on target weight and the number of combination hopper chambers for which the combination calculation is to be performed, after the discharge process, to thereafter perform the discharge path switching process according to the determined discharge groups before the combination calculation in the next combination process finishes and to perform the combination calculation in the next combination process with respect to each of the determined discharge groups.

In this case, if a single chamber weighing hopper and a double chamber memory hopper form a pair and the two accommodating chambers of the double chamber memory hopper are selected simultaneously to form a combination, then one of the accommodating chambers has not been fed with the objects to be weighed at a time point of next combination calculation and cannot be used in the next combination calculation (cannot participate in the combination). So, by determining each discharge group based on the target weight and the number of combination hopper chambers which are to be used in the next combination calculation, after the discharge process, it becomes possible to improve weighing precision in the combination of each discharge group as a whole. For example, when the target weights are equal, the discharge groups are determined so that the number of combination hopper chambers which are included in each discharge group and are to be used in combination calculation is equal or substantially equal.

Two combination hopper chamber lines may be arranged horizontally and the combination hopper chambers in the two combination hopper chamber lines may be disposed to form a pair; wherein the combination hopper chambers forming the pair in the two combination hopper chamber lines may be two weighing chambers of each weighing hopper having two weighing chambers which are fed with the objects to be weighed whose weights are measured; wherein the adjustment group is made up of one set or plural sets of the two weighing chambers of the weighing hopper; wherein a plurality of feeding means are disposed above the weighing hoppers to respectively correspond to the weighing hoppers and are each configured to feed the objects to be weighed selectively to one of the weighing chambers of a corresponding weighing hopper; wherein the plurality of feeding means are each configured to feed the objects to be weighed to one of the two weighing chambers of the corresponding weighing hopper in a time period from combination calculation in current combination process to combination calculation in next combination process when the control means repeats the combination process and the discharge process; and wherein the control means is configured to find combination hopper chambers which are to be fed with the objects to be weighed and are to be used in combination calculation at a time point when the combination calculation in the next combination process is performed and to determine the discharge groups based on target weight and the number of combination hopper chambers for which the combination calculation is to be performed, after the discharge process, to thereafter perform the discharge path switching process according to the determined discharge groups before the combination calculation in the next combination process finishes and to perform the combination calculation in the next combination process with respect to each of the determined discharge groups.

In this case, if two weighing chambers of a double chamber weighing hopper are selected simultaneously to form a combination, then one of the weighing chambers has not been fed with the objects to be weighed at a time point of next combination calculation and cannot be used in the next combination calculation (cannot participate in the combination). So, by determining each discharge group based on the target weight and the number of combination hopper chambers which are to be used in the next combination calculation, after the discharge process, it becomes possible to improve weighing precision in the combination of each discharge group as a whole. For example, when the target weights are equal, the discharge groups are determined so that the number of combination hopper chambers which are included in each discharge group and are to be used in combination calculation is equal or substantially equal.

Two combination hopper chamber lines may be arranged horizontally and the combination hopper chambers in the two combination hopper chamber lines may be disposed to form a pair; wherein the combination hopper chambers forming the pair in the two combination hopper chamber lines may be two accommodating chambers of each memory hopper having two accommodating chambers; two weighing chambers of each weighing hopper may be disposed above the two accommodating chambers of each memory hopper to respectively correspond to the accommodating chamber; the weighing hopper having two weighing chambers which are fed with the objects to be weighed whose weights are measured and are each configured to discharge the object to be weighed to a corresponding accommodating chamber; wherein the adjustment group may be made up of one set or plural sets of the two accommodating chambers of the memory hopper; a plurality of feeding means are disposed above the weighing hoppers to respectively correspond to the weighing hoppers and are each configured to feed the objects to be weighed selectively to one of the two weighing chambers of a corresponding weighing hopper; wherein the plurality of feeding means are each configured to feed the objects to be weighed to one of the two weighing chambers of the corresponding weighing hopper in a time period from combination calculation in current combination process to combination calculation in next combination process when the control means repeats the combination process and the discharge process; and wherein the control means may be configured to find combination hopper chambers which are to be fed with the objects to be weighed and are to be used in combination calculation at a time point when the combination calculation in the next combination process is performed and to determine the discharge groups based on target weight and the number of combination hopper chambers for which the combination calculation is to be performed, after the discharge process, to thereafter perform the discharge path switching process according to the determined discharge groups before the combination calculation in the next combination process finishes and to perform the combination calculation in the next combination process with respect to each of the determined discharge groups.

In this case, if a double chamber weighing hopper and a double chamber memory hopper form a pair and the two chambers of the memory hopper are selected twice in succession to form a combination, then one of the accommodating chambers of the memory hopper has not been fed with the objects to be weighed at a time point of next combination calculation and cannot be used in the next combination calculation (cannot participate in the combination). So, by determining each discharge group based on the target weight and the number of combination hopper chambers which are to be used in the next combination calculation, after the discharge process, it becomes possible to improve weighing precision in the combination of each discharge group as a whole. For example, when the target weights are equal, the discharge groups are determined so that the number of combination hopper chambers which are included in each discharge group and are to be used in combination calculation is equal or substantially equal.

The combination hopper chamber line may be configured such that adjacent two combination hopper chambers form a pair, and the combination hopper chambers forming the pair may be two chambers of each hopper having two chambers; wherein the adjustment group may be made up of one chamber of the hopper; wherein when the control means repeats the combination process and the discharge process, the objects to be weighed may be fed to one of the two chambers of the hopper in a time period from when the two chambers of the hopper are selected simultaneously by combination calculation in one combination process or combination calculation in two sequential combination processes until when combination calculation in next combination process is performed; and wherein the control means may be configured to find combination hopper chambers which are to be fed with the objects to be weighed and are to be used in combination calculation at a time point when the combination calculation in the next combination process is performed and determine the discharge groups based on target weight and the number of combination hoppers for which the combination calculation is to be performed, after the discharge process, to thereafter perform the discharge path switching process according to the determined discharge groups before the combination calculation in the next combination process finishes and to perform the combination calculation in the next combination process with respect to each of the determined discharge groups.

In this case, the adjustment group is made up of one chamber of each hopper having two chambers. For example, in a case where the single chamber weighing hopper and the double chamber memory hopper form a pair and the two accommodating chambers of the double chamber memory hopper are selected simultaneously to form a combination, or the two weighing chambers of the double chamber weighing hopper are selected simultaneously to form a combination, or the double chamber weighing hopper and the double chamber memory hopper form a pair and the two chambers of the memory hopper are selected to form a combination twice in succession, one of the chambers of the hopper has not been fed with the objects to be weighed and therefore cannot be used in next combination calculation (cannot participate in a combination). So, by determining each discharge group based on the target weight and the number of combination hopper chambers which are to be used in the next combination calculation, after the discharge process, it becomes possible to improve weighing precision in the combination of each discharge group as a whole. For example, when the target weights are equal, the discharge groups are determined so that the number of combination hopper chambers which are included in each discharge group and are to be used in combination calculation is equal or substantially equal.

The control means may be configured to perform the discharge process with respect to the discharge groups simultaneously.

The objects to be weighed are discharged simultaneously from the combination hopper chambers forming the combination in each discharge group, which have been determined by the combination calculation.

The combination hopper chamber line may be formed by the combination hopper chambers arranged circularly.

The combination hopper chamber line may be formed by the combination hopper chambers arranged in a straight line shape.

Target weights of the objects to be weighed discharged from the outlets of the discharge path switching chute may be different from each other, and the number of combination hopper chambers forming the base group corresponding to each outlet may be increased or decreased according to a magnitude of the target weight of the objects to be weighed discharged from each outlet.

The combination weigher may be configured to discharge the objects to be weighed discharged from a plurality of outlets of the discharge path switching chute to inlets of a plurality of packaging machines disposed to respectively correspond to the outlets.

The combination weigher may further comprise a plurality of collecting hoppers respectively provided at the outlets of the discharge path switching chute and are configured to hold the objects to be weighed discharged from the outlets and to discharge the objects to be weighed to the same inlet of a packaging machine; wherein the control means may be configured to sequentially select the plurality of collecting hoppers to discharge the objects to be weighed to the inlet of the packaging machine.

In accordance with this configuration, the objects to be weighed discharged from the respective discharge groups are held in the corresponding collecting hoppers, and are discharged sequentially from the collecting hoppers in a state where the objects to be weighed are gathered satisfactorily. Therefore, each discharge time required for the objects to be weighed discharged from each collecting hopper and a discharge cycle can be reduced, enabling high-speed operation. As a result, the combination weigher can be adapted to a packaging machine operated at a high speed.

As used herein, the term "difference" is defined as follows. For example, when a and b are arbitrary numbers, a difference between a and b means an absolute value of a value obtained by subtracting b from a or an absolute value of a value obtained by subtracting a from b. Therefore, the "difference" is always not less than zero and a "total of differences" is always not less than zero. This definition is, of course, applied to the difference between a total weight and a target weight of the objects to be weighed and a total of differences between optimal combination weights and the target weight.

Effects of the Invention

The present invention has the above described configuration, and provides effects of improving weighing precision in a combination weigher having a plurality of outlets from which the objects to be weighed are discharged based on combination calculation results.

The above and further objects, features and advantages of the invention will more fully be apparent from the following detailed description of embodiments with accompanying drawings.

Figure 1A:
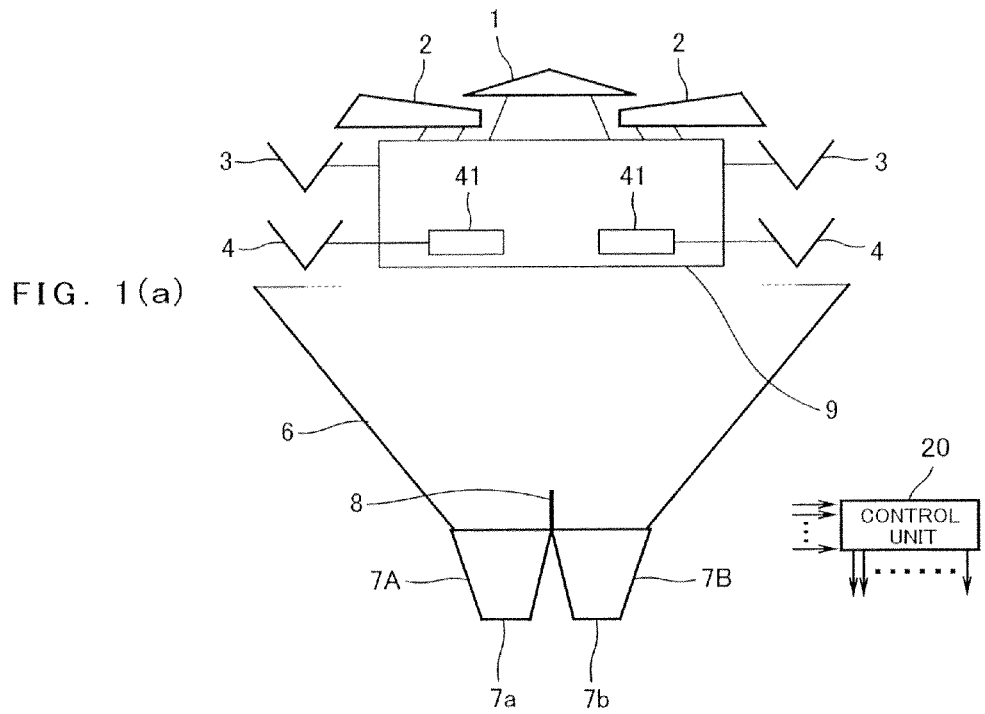
FIG. 1(a) is a schematic cross-sectional view of a combination weigher according to an example of an embodiment 1 of the present invention as viewed from a lateral side.

EXPLANATION OF REFERENCE NUMERALS 1 dispersion feeder
2 linear feeders
3 feeding hoppers
4 weighing hoppers
4a, 4b chambers of weighing hoppers (weighing chambers)
5 memory hoppers
5a, 5b chambers of memory hoppers (accommodating chambers)
6, 51 collecting chutes
7A, 7B, 52A, 52B collecting funnels
7a, 7b outlets of collecting funnel
10, 53 movable plates
21, 21A, 21B, 56 movable chutes
31, 59a, 59b separating plates
34, 65 movable plates
20, 70 control units

BEST MODE FOR CARRYING OUT THE INVENTION

Now, preferred embodiments of the present invention will be described with reference to the drawings.

Embodiment 1

Figure 1B:
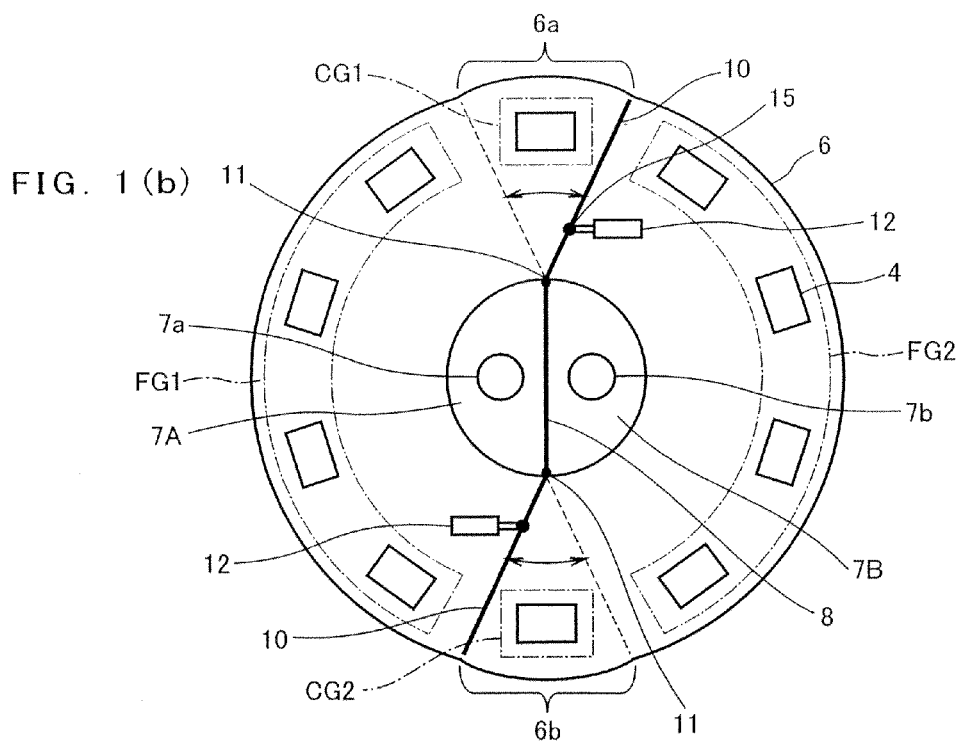
FIG. 1(b) is a schematic view of collecting chutes, collecting funnels, and others of the combination weigher as viewed from above.

FIG. 1(a) is a schematic cross-sectional view of a combination weigher according to an example of an embodiment 1 of the present invention as viewed from a lateral side, and FIG. 1(b) is a schematic view of collecting chutes, collecting funnels, and others of the combination weigher as viewed from above.

As shown in FIG. 1(a), the combination weigher is constructed in such a manner that a center base body (body) 9 is disposed at a center of the combination weigher and is supported by, for example, four legs (not shown), and a dispersion feeder 1 having a conical shape is mounted to an upper portion of the center base body 9 to radially disperse objects to be weighed supplied from an external supplying device by vibration. Around the dispersion feeder 1, linear feeders 2 are provided to transfer the objects to be weighed sent from the dispersion feeder 1 into respective feeding hoppers 3 by vibration. A plurality of feeding hoppers 3 and weighing hoppers 4 are disposed below the linear feeders 2 and are arranged circularly around the center base body 9 in such a manner that each feeding hopper 3 and each weighing hopper 4 correspond to the associated one of the linear feeders 2. The dispersion feeder 1, the linear feeders 2, the feeding hoppers 3, and the weighing hoppers 4 are mounted to the center base body 9, and drive units therefore (vibration devices for the dispersion feeder 1 and the linear feeders 2, gate opening and closing devices for the feeding hoppers 3 and the weighing hoppers 4, etc) are accommodated in the center base body 9. Each weighing hopper 4 is attached with a weight sensor 41 such as a load cell, which measures the weight of the objects to be weighed inside the weighing hopper 4. The weight sensors 41 are accommodated along with the drive units in the centre base body 9. In FIG. 1(b), the dispersion feeder 1, the linear feeders 2, the feeding hoppers 3, and the center base body 9 are not illustrated.

A collecting chute 6 of a substantially inverted frustoconical shape is disposed below the weighing hoppers 4 arranged circularly. Two collecting funnels 7A and 7B are mounted to a lower part of the collecting chute 6 to gather the objects to be weighed sliding down on the collecting chute 6 and to discharge them from outlets 7a and 7b. The collecting funnels 7A and 7B are opened in a semi-circular shape at their upper parts and are provided at their bottom parts with the outlets 7a and 7b forming circular openings.

Figure 2:
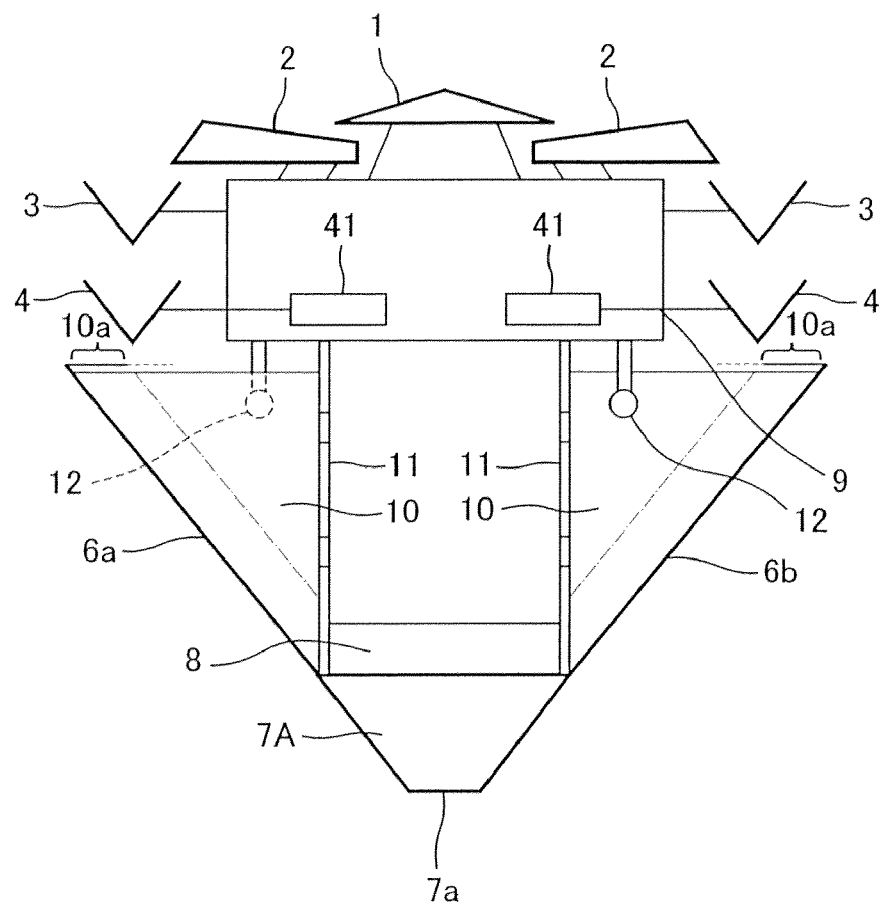
FIG. 2 is a schematic cross-sectional view of a combination weigher according to the example of the embodiment 1 of the present invention as viewed from a lateral side different from that of FIG. 1(a)

Movable plates 10 are provided to partition a space above the collecting chute 6. FIG. 2 is a schematic cross-sectional view as viewed from the collecting funnel 7A side (from leftward in FIG. 1(b)). Fixed shafts 11 are fastened to extend vertically between both end portions of a boundary between upper portions of the collecting funnels 7A and 7B and a bottom surface of the center base body 9, and the movable plates 10 are respectively rotatably mounted to the fixed shafts 11 by hinges and the like. Each movable plate 10 is actuated by an air cylinder 12 controlled by a control unit 20 so as to be rotated around the fixed shaft 11. Because of such rotation of the movable plate 10, shoot portions 6a and 6b located in a range where the movable plates 10 are rotatable are slightly protruded outward. Each air cylinder 12 is mounted and fastened to the bottom surface of the center base body 9. At a coupling portion 15 at which a piston rod of the air cylinder 12 and the movable plate 10 are coupled to each other, the piston rod of the air cylinder 12 is mounted to the movable plate 10 to be horizontally pivotable. Also, the coupling portion 15 is horizontally slidable along a surface of the movable plate 10. The piston rod moves forward and backward in the above configuration, causing the movable plate 10 to be rotated around the fixed shaft 11. In FIG. 1(b), a solid line indicates a position of the movable plate 10 when the piston rod is in a backward position and a broken line indicates a position of the movable plate 10 when the piston rod is in a forward position. Depending on the position of each movable plate 10, it is determined whether the objects to be weighed inside the weighing hopper 4 in each adjustment group CG1 or CG2 are discharged to the collecting funnel 7A or to the collecting funnel 7B. In FIG. 1(a), the fixed shafts 11, the movable plates 10, and the air cylinders 12 are not illustrated.

The weighing hoppers 4 arranged circularly are divided into a plurality of base groups FG1 and FG2 and adjustment groups CG1 and CG2 between them. The base group FG1 is made up of the weighing hoppers 4 which discharge the objects to be weighed which travel through the collecting funnel 7A. The base group FG2 is made up of the weighing hoppers 4 which discharge the objects to be weighed which travel through the collecting funnel 7B. Each of the adjustment groups CG1 and CG2 is made up of the weighing hopper 4 which discharges the objects to be weighed which travel through the collecting funnel 7A or through the collecting funnel 7B depending on the position of the movable plate 10. In a state where the movable plates 10 are in the position indicated by the solid line in FIG. 1(b), the objects to be weighed discharged from the weighing hopper 4 in the adjustment group CG1 travel through the collecting funnel 7A, and the objects to be weighed discharged from the weighing hopper 4 in the adjustment group CG2 travel through the collecting funnel 7B. Whereas only one adjustment group is provided between the base groups FG1 and FG2 herein, a plurality of adjustment groups may alternatively be provided. In this case, the movable plate 10 is controlled to move and stop for each adjustment group. In addition, whereas each of the adjustment groups CG1 and CG2 is made up of one weighing hopper 4, it may alternatively be made up of a plurality of weighing hoppers 4 arranged continuously. For example, when two weighing hoppers 4 are one adjustment group, the movable plate 10 is controlled to move and stop for each set of two weighing hoppers 4.

The control unit 20 is configured to control an operation of the entire combination weigher and to perform a combination process described later. In the combination process, each of the adjustment groups CG1 and CG2 is combined with either one of the base groups FG1 and FG2 at their both sides to find a plurality of discharge groups each of which includes one base group and is made up of a plurality of weighing hoppers 4 arranged continuously, and combination calculation is performed based on measured values of the weighing hoppers 4 belonging to each discharge group (weights of the objects to be weighed inside the weighing hoppers 4 measured by the weight sensors 41) in finding each discharge group to select a combination of discharge hoppers (optimal combination) from the weighing hoppers 4 belonging to each discharge group. In this embodiment, a discharge group (hereinafter referred to as a discharge group A) including the base group FG1 and a discharge group (hereinafter referred to as a discharge group B) including the base group FG2 are determined, and the movable plates 10 are moved to a boundary between the discharge group A and the discharge group B. For example, if FIG. 1(b) shows that the movable plates 10 are moved to the boundary between the discharge group A and the discharge group B, it is determined that the discharge group A is composed of the base group FG1 and the adjustment group CG1 and the discharge group B is composed of the base group FG2 and the adjustment group CG2. The objects to be weighed discharged from the weighing hoppers 4 forming the optimal combination in the discharge group A are gathered to the collecting funnel 7A and are discharged from the outlet 7a, while the objects to be weighed discharged from the weighing hoppers 4 forming the optimal combination in the discharge group B are gathered to the collecting funnel 7B and are discharged from the outlet 7b.

Two packaging machines which are not shown are disposed below the combination weigher. The objects to be weighed which are discharged from the outlet 7a of the collecting funnel 7A are fed into one of the packaging machines, and the objects to be weighed which are discharged from the outlet 7b of the collecting funnel 7B are fed into the other packaging machine. The collecting chute 6, the collecting funnels 7A and 7B, and the movable plates, and others (10, 11, 12) form discharge path switching chutes.

Whereas in this embodiment, a separating plate 8 is provided at a boundary between the upper parts of the collecting funnels 7A and 7B so that the objects to be weighed discharged from the weighing hoppers 4 of the discharge groups A and B and sliding down on the collecting chute 6 are prevented from falling into wrong collecting funnels, it may be omitted.

The operation of the combination weigher constructed above will now be described.

The objects to be weighed are supplied from an external supplying device to the dispersion feeder 1 and are fed from the dispersion feeder 1 to each feeding hopper 3 through each linear feeder 2. Each feeding hopper 3 feeds the objects to be weighed to each weighing hopper 4. The combination process and a discharge process shown in the flowchart of FIG. 3 are performed in such a manner that the feeding hoppers 3 feed the objects to be weighed to the weighing hoppers 4 which are empty and the linear feeder 2 feeds the objects to be weighed to the feeding hoppers 3 which are empty.

Figure 3:
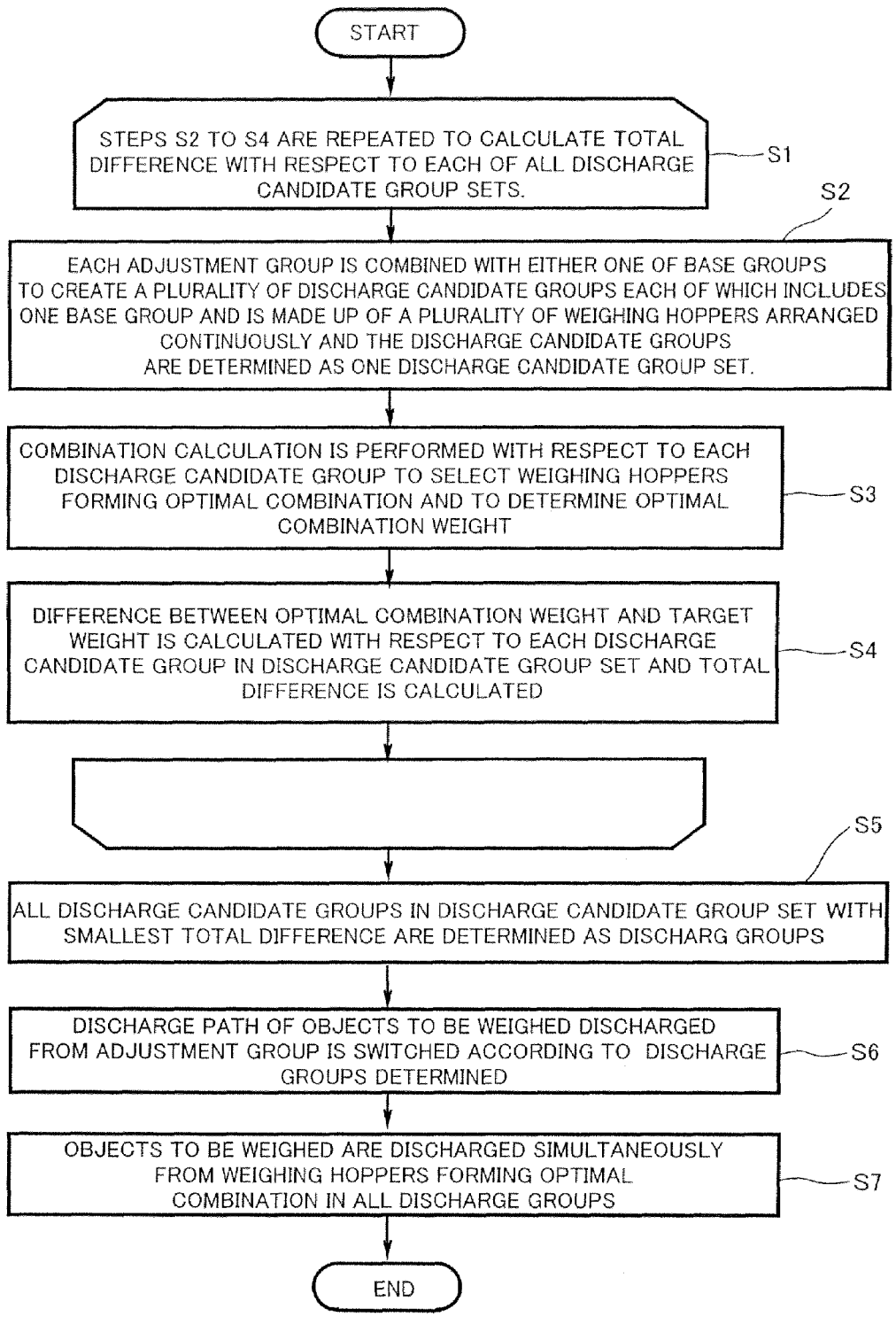
FIG. 3 is a flowchart showing an operation of the combination weigher according to the embodiment 1 of the present invention.

FIG. 3 is the flowchart showing the operation of the combination weigher of this embodiment. The combination process are processes in steps S1 to S5. The control unit 20 contains a memory therein, and is configured to store in the memory information necessary for the combination process (information as to which weighing hoppers make up for the base groups, the adjustment groups, discharge candidate groups, and discharge groups as described later, information indicating weighing hoppers forming optimal combination, information indicating optimal combination weights, information indicating differences and total difference calculated in step S4).

A repeat step S1 is to repeat processes in steps S2 to S4 described below to calculate a total difference described later with respect to each of all discharge candidate groups.

In step S2, each adjustment group is combined with either one of the base groups located at its both sides. Thus, all the base groups and adjustment groups are re-divided into a plurality of discharge candidate groups each of which includes one base group and is made up of a plurality of weighing hoppers 4 arranged continuously, and these pluralities of discharge candidate groups are determined as one discharge candidate group set.

In step S3, the process is performed with respect to each of discharge candidate groups in the discharge candidate group set in such a manner that the combination calculation is performed based on the weights of the objects to be weighed which have been fed into the weighing hoppers 4 in the discharge candidate group to select the weighing hoppers 4 forming a combination (optimal combination) in which a total weight of the objects to be weighed falls within an allowable range with respect to the target weight and a difference with the target weight is smallest and to determine a total measured value of the weighing hoppers 4 forming the optimal combination as an optimal combination weight.

In step S4, a difference between the optimal combination weight and the target weight is calculated with respect to each discharge candidate group in the discharge candidate group set and a total difference of the differences calculated for the respective discharge candidate groups is calculated.

The processes in the above steps S2 to S4 are repeated plural times to calculate a total of the differences with respect to each of all discharge candidate group sets in which at least two discharge candidate groups are different. The processes in the repeat step S1 (S2 to S4) are the same if all discharge candidate group sets are found and the steps S3 and S4 are performed with respect to each of the discharge candidate group sets. Alternatively, all the discharge candidate group sets may be pre-stored in the memory of the control unit 20, and the steps S3 and S4 may be performed with respect to each of the discharge candidate group sets.

In the configuration of FIG. 1, each discharge candidate group set is composed of a first discharge candidate group including the base group FG1 and a second discharge candidate group including the base group FG2, and four discharge candidate group sets are found as follows: a discharge candidate group set in which the first discharge candidate group consists of the base group FG1, and the second discharge candidate group is made up of the base group FG2 and the two adjustment groups CG1 and CG2, a discharge candidate group set in which the first discharge candidate group is made up of the base group FG1 and the adjustment group CG1 and the second discharge candidate group is made up of the base group FG2 and the adjustment group CG2, a discharge candidate group set in which the first discharge candidate group is made up of the base group FG1 and the adjustment group CG2 and the second discharge candidate group is made up of the base group FG2 and the adjustment group CG1, and a discharge candidate group set in which the first discharge candidate group is made up of the base group FG1 and the two adjustment groups CG1 and CG2 and the second discharge candidate group consists of the base group FG2. The steps S3 and S4 are performed with respect to each of the four discharge candidate groups, thus calculating the total difference with respect to each discharge candidate group set.

In step S5, one discharge candidate group set whose total difference calculated in step S4 is smallest is selected from all the discharge candidate group sets and all the discharge candidate groups in that discharge candidate group set are determined as the discharge groups.

In step S6, a discharge path of the objects to be weighed discharged from the adjustment groups is switched according to the discharge groups determined in step S5. To be specific, the discharge path is switched so that the objects to be weighed discharged from the weighing hoppers 4 of the adjustment group are discharged from the outlet corresponding to the discharge group to which that adjustment group belongs. In the configuration of FIG. 1, the discharge path is switched by moving the movable plates 10. When it is determined through the combination process (S1 to S5) that a total difference in a discharge candidate group set in which the first discharge candidate group is made up of the base group FG1 and the adjustment group CG1 and the second discharge candidate group is made up of the base group FC2 and the adjustment group CG2 is smallest, the first discharge candidate group made up of the base group FG1 and the adjustment group CG1 is determined as the discharge group A and the second discharge candidate group made up of the base group FG2 and the adjustment group CG2 is determined as the discharge group B. In step S6, the control unit 20 controls each air cylinder 12 to move each movable plate 10 to the position indicated by the solid line of FIG. 1(*b*). When each movable plate 10 is in this position, each movable plate 10 remains still as a matter of course.

In step S7, gates of the weighing hoppers 4 forming the optimal combinations in all discharge groups are opened at the same time to discharge the objects to be weighed.

The difference between the optimal combination weight and the target weight calculated with respect to each discharge candidate group in step S4 will be now described. The combination calculation is performed to select, as weighing hoppers 4 forming the optimal combination, weighing hoppers 4 forming the combination whose total measured value falls within the allowable range with respect to the target weight and whose difference with the target weight is smallest. In a case where the allowable range is not less than the target weight, the target weight may be subtracted from the optimal combination weight to obtain the difference. In a case where a value smaller than the target weight is a lower limit value of the allowable range and a value larger than the target value is an upper limit value of the allowable range, the target weight may be subtracted from the optimal combination weight to obtain the above difference if the optimal combination weight is larger than the target weight, while the optimal combination weight may be subtracted from the target weight if the optimal combination weight is smaller than the target weight. In either case, an absolute value (zero or positive value) of a value obtained by subtracting the target weight from the optimal combination weight or an absolute value (zero or positive value) of a value obtained by subtracting the optimal combination weight from the target weight may be obtained as the above difference. Also, in step S3, the weighing hoppers 4 forming the optimal combination are determined in such a manner that the difference between the total weight of the objects to be weighed fed into the weighing hoppers 4 and the target weight is calculated and the combination whose difference is smallest is determined as the optimal combination. The difference calculated in this case is identical to that described above, and zero or the positive value.

A shape of each movable plate 10 may be suitably changed. For example, a portion 10*a* in a range from one-dotted line of FIG. 2 to an outer shape of the collecting chute 6 which is at least required to prevent the objects to be weighed from falling into the collecting funnel of other discharge group, a portion rotatably mounted to the fixed shaft 11, a coupling portion at which the piston rod of the air cylinder 12 and the movable plate 10 are coupled to each other are needed, but a center region except for these portions may be omitted to create a space.

Whereas the movable plate 10 is actuated by the air cylinder 12 to be rotatable, other configuration may be employed. For example, the fixed shaft 11 may be replaced by a rotational shaft to which the movable plate 10 is fixedly mounted, a bearing may be provided on a lower part of the rotational shaft and an upper part of the rotational shaft may be coupled to a motor shaft of a motor (stepping motor) so that the motor rotates the rotational shaft, allowing the movable plate 10 to operate in the same manner. The motor may be fixedly mounted to, for example, the bottom surface of the center base body 9.

Figure 18A:
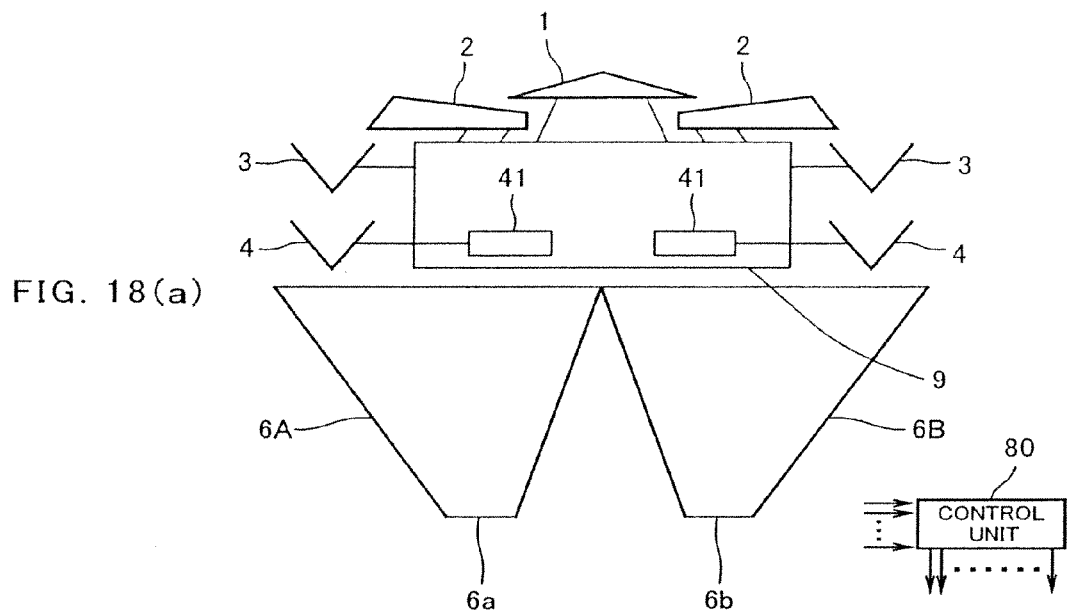
FIG. 18(a) is a schematic cross-sectional view of a conventional combination weigher as viewed from a lateral side.
Figure 18B:
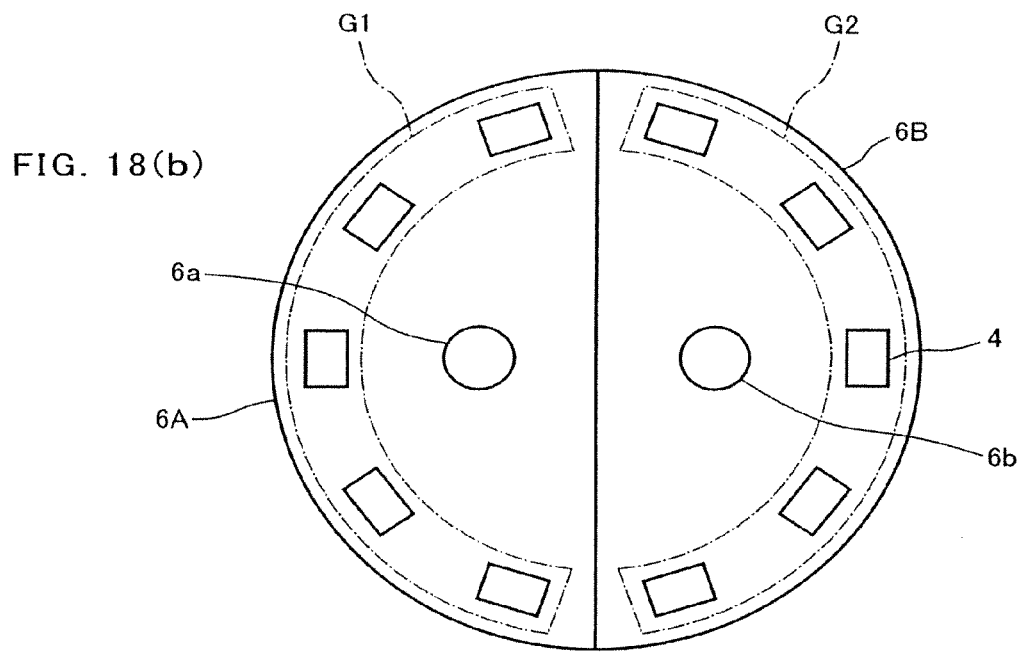
FIG. 18(b) is a schematic view of weighing hoppers and collecting chutes of the combination weigher as viewed from above.

In this embodiment, the weighing hoppers 4 are divided into the base groups and the adjustment groups, each adjustment group is combined with either one of the base groups at its both sides to determine the discharge groups, and the movable plate 10 is moved according to the discharge group to which each adjustment group belongs so that the objects to be weighed discharged from the weighing hoppers 4 in each adjustment group are discharged selectively to the collecting funnel 7A or 7B. In contrast to the conventional example in which there are no adjustment groups, and the weighing hoppers forming the optimal combination are selected from the fixed groups G1 and G2 (see FIG. 18(*b*)), one set in which the total of differences between the optimal combination weights and the target weight is smallest is selected from a plurality of discharge candidate group sets, and groups making up of that set are determined as a plurality of discharge groups. As a result, weighing precision of the combination of each discharge group can be improved as a whole, even when a total number of the weighing hoppers 4 is fixed. Also, when the allowable range in the combination calculation is not less than the target weight, the set in which the total of differences between the optimal combination weights and the target weight is smallest is determined as the plurality of discharge groups as described above. This makes it possible to lessen the total weight of the optimal combination weights of the discharge groups and to therefore reduce a consumption amount of the objects to be weighed.

Embodiment 2

Figure 4A:
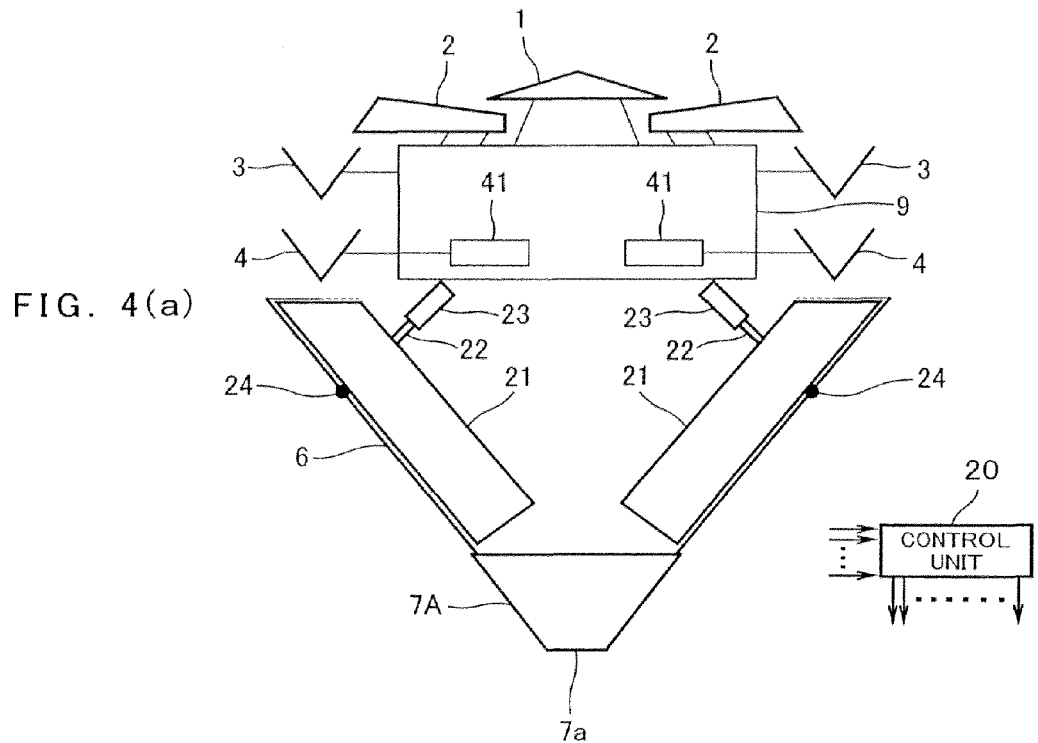
FIG. 4(a) is a schematic cross-sectional view of a combination weigher according to a first example of an embodiment 2 of the present invention as viewed from a lateral side.
Figure 4B:
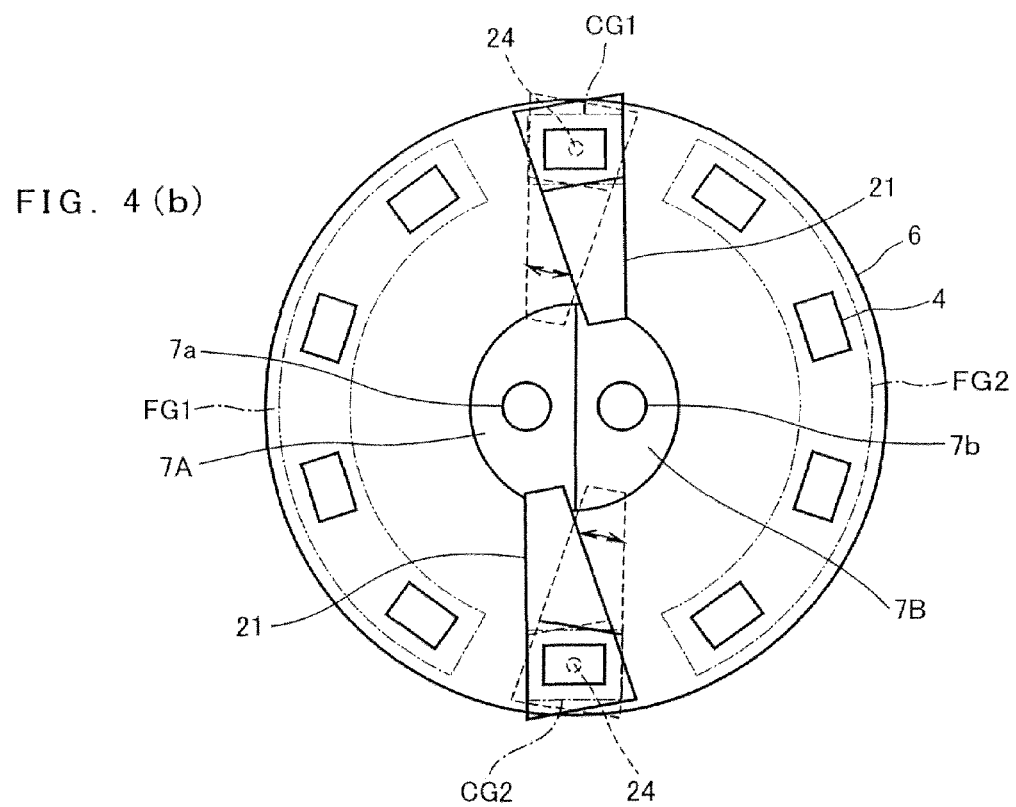
FIG. 4(b) is a schematic view of collecting chutes, collecting funnels, and others of the combination weigher as viewed from above.

FIG. 4(a) is a schematic cross-sectional view of a combination weigher according to a first example of an embodiment 2 of the present invention as viewed from a lateral side, and FIG. 4(b) is a schematic view of collecting chutes, collecting funnels, and others of the combination weigher as viewed from above. In FIG. 4, the same reference numerals as those of FIGS. 1 and 2 denote the same parts, which will not be further described.

A main distinction between the first example of this embodiment and the embodiment 1 is that the movable plates 10 in the embodiment 1 are replaced by movable chutes 21. The movable chutes 21 are each formed of a tubular member with a rectangular cross-section, and are respectively disposed on the collecting chute 6 and below the weighing hoppers 4 in the adjustment groups CG1 and CG2. The movable chutes 21 receive the objects to be weighed discharged from the weighing hoppers 4 of the adjustment groups CG1 and CG2 through openings at their upper parts, and feed out the objects to be weighed to the collecting funnels 7A and 7B through openings (feed outlets) at their lower ends. Each movable chute 21 is rotated by, for example, a motor 23 so that its feed outlet is directed toward the collecting funnel 7A or the collecting funnel 7B. To this end, the movable chute 21 is coupled at an upper surface thereof to the motor shaft 22, and a mounting portion 24 by which the movable chute 21 is mounted to the collecting chute 6 is provided on a region of a lower surface of the movable plate 21 which is in a position on a extended line of the motor shaft 22. By the mounting member 24, the movable chute 21 is rotatably mounted to the collecting chute 6. For example, a short shaft may be configured to protrude from the lower surface of the movable plate 21 which is in a position on the extended line of the motor shaft 22 toward the collecting chute 6, and a bearing or a shaft hole may be provided in the collecting chute 6 to receive the shaft. In this case, the upper surface of the movable chute 21 may be opened in a region except for a portion required to couple the motor shaft 22 provided that the objects to be weighed do not fly outside the movable chute 21.

The flowchart showing the operation of the combination weigher of this embodiment is shown in FIG. 3 as in the embodiment 1.

The distinction between the operation of the embodiment 1 and the operation of this embodiment is only a specific operation in the process of step S6, and the other operation is identical to that of the embodiment 1. To be specific, since the movable chutes 21 are provided instead of the movable plates 10 in the embodiment 1, the discharge path is switched in step S6 in such a manner that the control unit 20 controls the motors 23 to rotate the movable chutes 21, in this embodiment. When the discharge group A which discharges the objects to be weighed to the collecting funnel 7A which has been determined in step S5 includes the adjustment group CG1 (when the discharge group B which discharges the objects to be weighed to the collecting funnel 7B does not include the adjustment group CG1), the feed outlet of the movable chute 21 below the adjustment group CG1 is rotated to be directed toward the collecting funnel 7A, while when the discharge group A does not include the adjustment group CG1 (when discharge group B includes the adjustment group CG1) the feed outlet of the movable chute 21 below the adjustment group CG1 is rotated to be directed toward the collecting funnel 7B. The same applies to the movable chute 21 below the adjustment group CG2.

Figure 5:
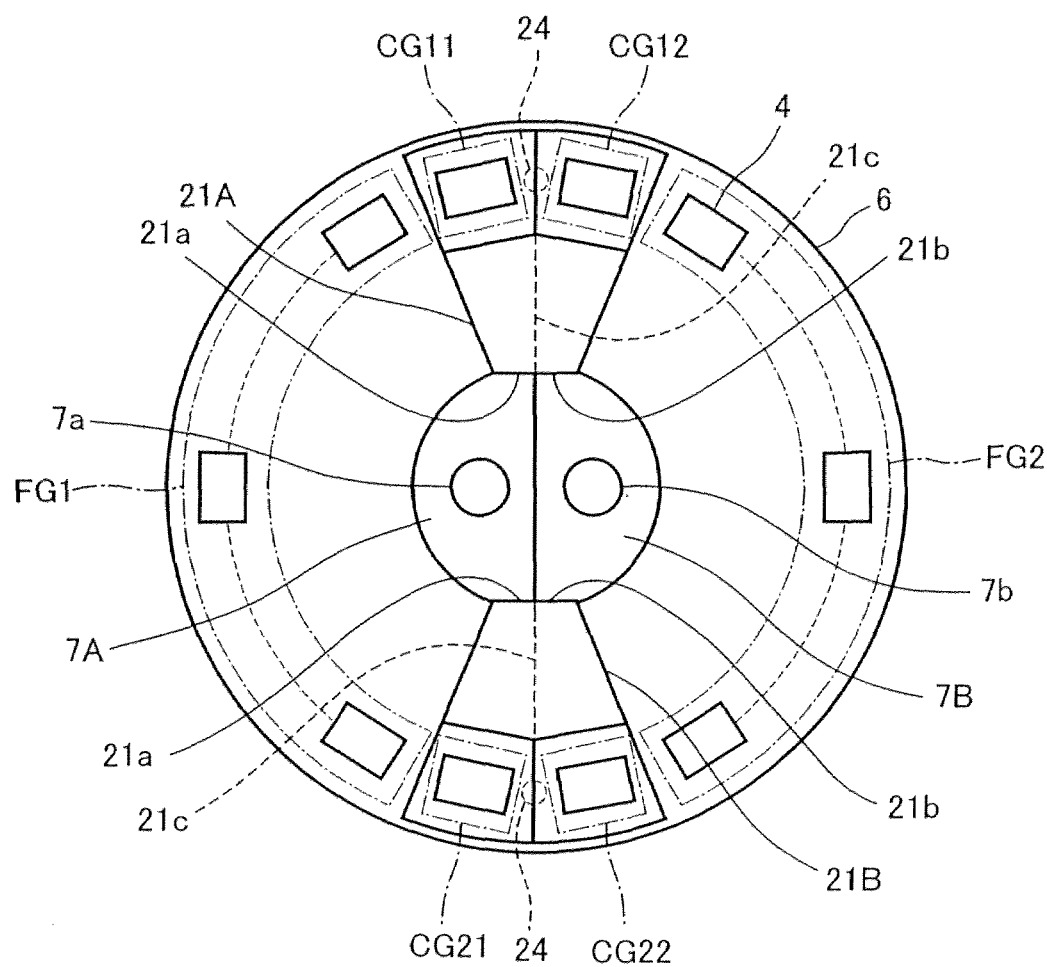
FIG. 5 is a schematic view of collecting chutes, collecting funnels, and others of a combination weigher according to a second example of the embodiment 2 of the present invention, as viewed from above.

Subsequently, a second example of the embodiment 2 of the present invention is shown in FIG. 5. FIG. 5 is a schematic view of collecting chutes collecting funnels, and others of the combination weigher according to the second example of the embodiment 2 of the present invention, as viewed from above. The schematic cross-sectional view of the combination weigher as viewed from the lateral side is identical to FIG. 4(a) except that movable chutes 21A replace the movable chutes 21.

FIG. 5 shows the example in which two adjustment groups (CG11, CG12) are provided between the base groups FG1 and FG2, and two adjustment groups (CG21, CG22) are provided between the base groups FG1 and FG2. The movable chute 21A is disposed below the two adjustment groups CG11 and CG12, and the movable chute 21B is disposed below the two adjustment groups CG21 and CG22. The movable chutes 21A and 21B are formed of tubular members. The mounting portion 24 is provided on a lower surface of each of the movable chutes 21A and 21B to mount each movable chute to the collecting chute 6, and each movable chute is coupled at the upper surface thereof to the motor shaft 22 so that each movable chute is rotated by the motor 23 as in the movable chute 21 of FIG. 4. The movable chute in this example, for example, the movable chute 21A disposed below the two adjustment groups CG11 and CG12 is provided at a center region thereof with a separating plate 21c for forming two separate paths for the objects to be weighed to travel there through so that the objects to be weighed discharged from the adjustment groups CG11 and CG12 will not be mixed with each other. The objects to be weighed which are discharged from the adjustment group CG11 travel through one path and are discharged from the feed outlet 21a, while the objects to be weighed discharged from the adjustment group CG12 travel through the other path and are discharged from the feed outlet 21b. The movable chute 21B disposed below the two adjustment groups CG21 and CG22 is configured in the same manner. The upper surface of each of the movable chutes 21A and 21B may be opened in a region except for a portion required to couple the motor shaft 22 provided that the objects to be weighed do not fly to outside.

In this case, the discharge group A including the base group FG1 and the discharge group B including the base group FG2 which are determined in the step S5 (FIG. 3) of the combination process are discharge groups in a set selected from nine discharge candidate group sets described below. Each discharge candidate group set is made up of the first discharge candidate group including the base group FG1 and the second discharge candidate group including the base group FG2. The nine discharge candidate group sets are: a discharge candidate group set in which the first discharge candidate group does not include the adjustment group and the second discharge candidate group includes all adjustment groups CG11, CG12, CG21, and CG22, a discharge candidate group set in which the first discharge candidate group includes one adjustment group CG11 and the second discharge candidate group includes three adjustment groups CG12, CG21, and CG22, a discharge candidate group set in which the first discharge candidate group includes one adjustment group CG21 and the second discharge candidate group includes three adjustment groups CG11, CG12, and CG22, a discharge candidate group set in which the first discharge candidate group includes two adjustment groups CG11 and CG12, and the second discharge candidate group includes two adjustment groups CG21 and CG22, a discharge candidate group set in which the first discharge candidate group includes two adjustment groups CG21 and CG22 and the second discharge candidate group includes two adjustment groups CG11 and CG12, a discharge candidate group set in which the first discharge candidate group includes two adjustment groups CG11 and CG21 and the second discharge candidate group includes two adjustment groups CG12 and CG22, a discharge candidate group set in which the first discharge candidate group includes three adjustment groups CG11, CG21 and CG22 and the second discharge candidate group includes one adjustment group CG12, a discharge candidate group set in which the first discharge candidate group includes three adjustment groups CG11, CG12 and CG21 and the second discharge candidate group includes one adjustment group CG22, and a discharge candidate group set in which the first discharge candidate group includes all the adjustment groups CG12, CG12, CG21 and CG22 and the second discharge candidate group includes no adjustment group. As already described in the embodiment 1, the discharge candidate group (discharge group) is made up of a plurality of weighing hoppers 4 arranged continuously. That is, for example, a combination group which includes the base group FG1 and the adjustment group CG12 and does not include the adjustment group CG11 between them does not make a discharge candidate group (discharge group).

According to the adjustment groups included in the discharge group A and the discharge group B, the control unit 20 controls each motor 23 to rotate each of the movable chutes 21A and 21B to a desired position, that is, performs switching of the discharge path in step S6 of FIG. 3. For example, in a case where the discharge group A includes the adjustment group CG11 and the discharge group B includes the adjustment group CG12, the movable chute 21A is rotated so that the feed outlet 21a of the movable chute 21A is directed toward the collecting funnel 7A and the feed outlet 21b of the movable chute 21A is directed toward the collecting funnel 7B (state in FIG. 5). In a case where the discharge group A includes the adjustment groups CG11 and CG12, the movable chute 21A is rotated so that the feed outlets 21a and 21b of the movable chute 21A are directed toward the collecting funnel 7A. In a case where the discharge group A does not include the adjustment groups CG11 and CG12 (discharge group B includes the adjustment groups CG11 and CG12), the movable chute 21A is rotated so that the feed outlets 21a and 21b of the movable chute 21A are directed toward the collecting funnel 7B. The same applied to the movable chute 21B.

In this embodiment, the movable plates 10 of the embodiment 1 are replaced by the movable chutes 21 (21A, 21B), and the effects similar to those of the embodiment 1 are achieved.

Embodiment 3

Figure 6A:
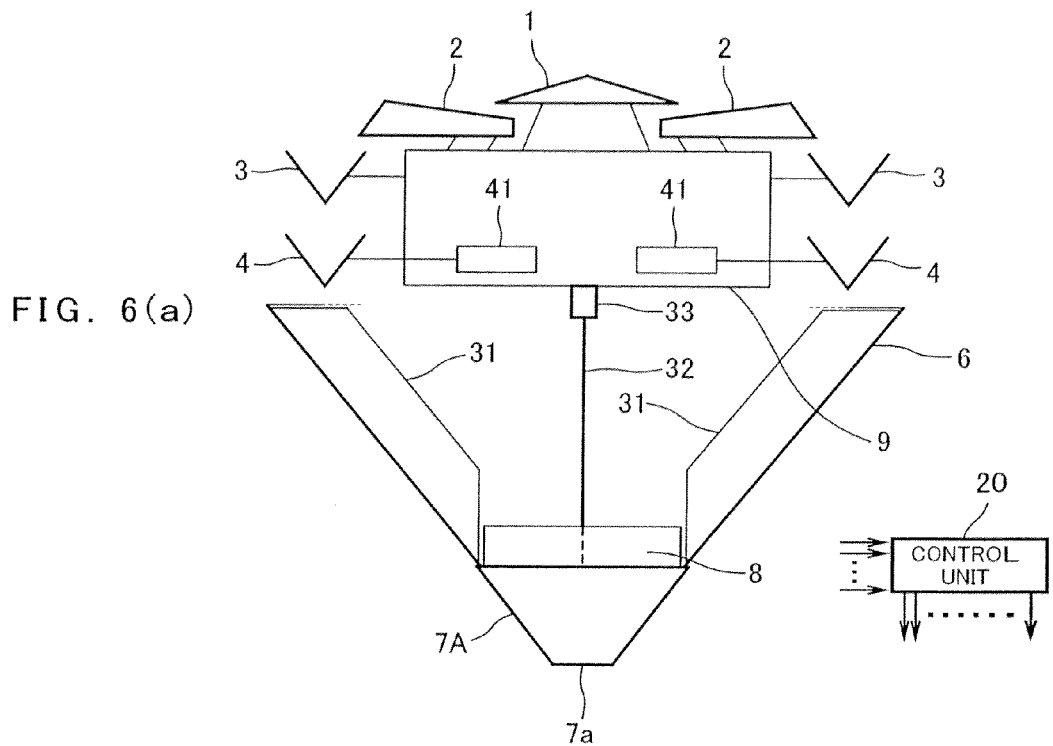
FIG. 6(a) is a schematic cross-sectional view of a combination weigher according to a first example of an embodiment 3 of the present invention as viewed from a lateral side.
Figure 6B:
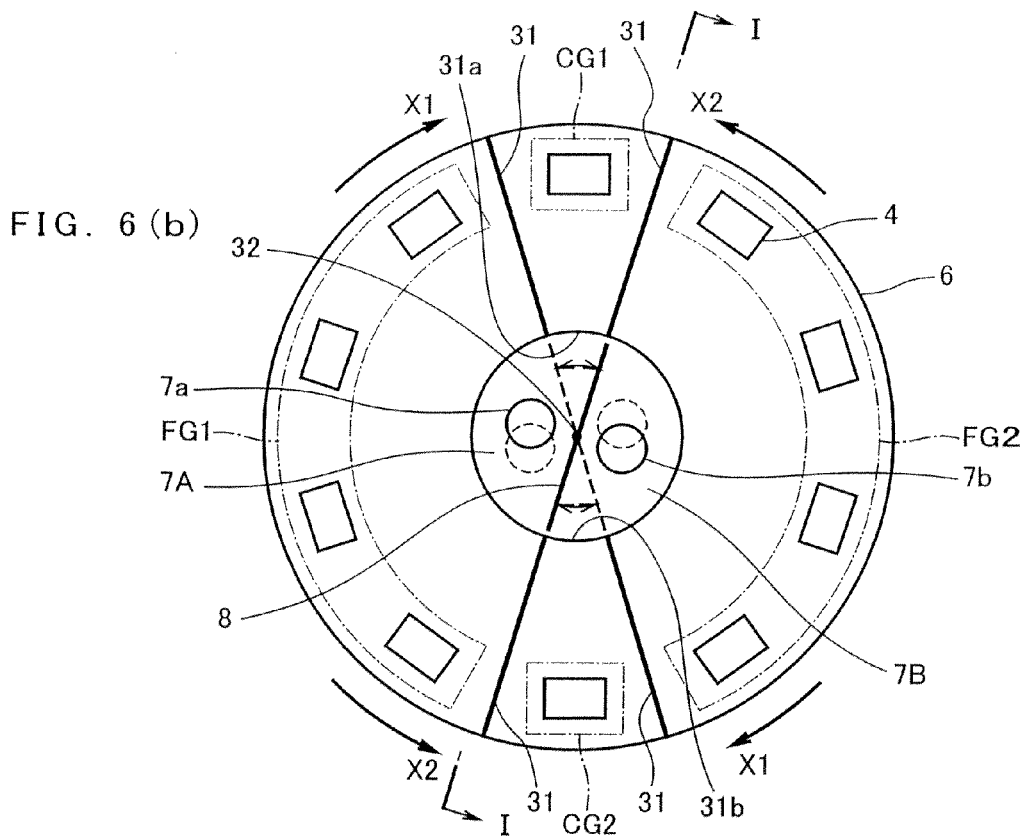
FIG. 6(b) is a schematic view of collecting chutes, collecting funnels, and others of the combination weigher as viewed from above.

FIG. 6(a) is a schematic cross-sectional view of a combination weigher according to a first example of an embodiment 3 of the present invention as viewed from a lateral side, and FIG. 6(b) is a schematic view of collecting chutes, collecting funnels, and others of the combination weigher as viewed from above. FIG. 6(a) shows a cross-section taken along line I-I of FIG. 6(b). In FIG. 6, the same reference numerals as those of FIGS. 1 and 2 denote the same parts, which will not be further described.

A significant distinction between the first example of this embodiment and the embodiment 1 is that the movable plates 10 of the embodiment 1 are replaced by separating plates 31 fixedly mounted onto the collecting chute 6 to form there above paths exclusive for the objects to be weighed discharged from the adjustment groups and the two collecting funnels 7A and 7B are configured to be rotatable. In this embodiment, to enable the collecting funnels 7A and 7B to be rotated, a motor shaft 32 is coupled to the center of each of them so that the motor 33 causes them to be rotated. The motor 33 is fixedly mounted to, for example, the bottom surface of the center base body 9.

In this embodiment, the number of adjustment groups disposed between the base groups is equal (k), and a part of the process in the step S2 of FIG. 3 is different. To be specific, in the process in the step S2, the adjustment groups present on the side of a first line direction in which the plurality of weighing hoppers 4 are arranged are combined with the respective base groups in equal number (m: 0 to k) and the adjustment groups present on the side of a second line direction opposite to the first line direction are combined with the respective base groups in equal number (n: n=k−m). Thus, discharge candidate groups are found and determined as a discharge candidate group set. One value of m (n) is used in every process of the step S2 repeated and is changed every time the step S2 is repeated within the repeat step S1. The repeat step S1 is terminated when all values (integers) from 0 to k have been used as m.

In the configuration of FIG. 6, k=1, the first line direction is X1 direction, the second line direction is X2 direction, and m=0, 1 (n=1, 0). In this configuration, the weighing hoppers 4 are arranged circularly, and adjustment groups are present at both sides of the base groups FG1 and FG2. In this case, when m=0 (n=1) is set in first step S2, zero adjustment group on the X1 direction side is combined with the base group FG1 and one adjustment group CG2 on the X2 direction side is combined with the base group FG1 to create a discharge candidate group made up of the base group FG1 and the adjustment group CG2. In the same manner, zero adjustment group on the X1 direction side is combined with the base group FG2 and one adjustment group CG1 on the X2 direction side is combined with the base group FG2 to create a discharge candidate group made up of the base group FG2 and the adjustment group CG1. In this manner, in the first step S2, the above two discharge candidate groups are found and determined as a first discharge candidate group set. Then, when m=1 (n=0) is set in second step S2, one adjustment group CG1 on the X1 direction side is combined with the base group FG1 and zero adjustment group on the X2 direction side is combined with the base group FG1 to create a discharge candidate group made up of the base group FG1 and the adjustment group CG1. In the same manner, one adjustment group CG2 on the X1 direction side is combined with the base group FG2 and zero adjustment group on the X2 direction side is combined with the base group FG2 to create a discharge candidate group made up of the base group FG2 and the adjustment group CG2. In this manner, in the second step S2, the two discharge candidate groups are found and determined as a second discharge candidate group set.

In the configuration of this embodiment, when the two adjustment groups (CG11, CG12), and the two adjustment groups (CG21, CG22) are provided between the base groups FG1 and FG2 as shown in FIG. 5, the number k of the adjustment groups disposed between the base groups is k=2, the first line direction is X1 direction (FIG. 6), the second line direction is X2 direction (FIG. 6), and m=0, 1, 2 (n=2, 1, 0).

In this case, for example, when m=0 (n=2) is set in first step S2, zero adjustment group on the X1 direction side is combined with the base group FG1 and the two adjustment groups CG21 and CG22 on the X2 direction side are combined with the base group FG1 to create a discharge candidate group made up of the base group FG1 and the adjustment groups CG21 and CG22. In the same manner, zero adjustment group on the X1 direction side is combined with the base group FG2 and two adjustment groups CG11 and CG12 on the X2 direction side are combined with the base group FG2 to create a discharge candidate group made up of the base group FG2 and the adjustment groups CG11 and CG12. In this manner, in the first step S2, the above two discharge candidate groups are found and determined as a first discharge candidate group set. Then, when m=1 (n=1) is set in second step S2, one adjustment group CG11 on the X1 direction side is combined with the base group FG1 and one adjustment group CG21 on the X2 direction side is combined with the base group FG1 to create a discharge candidate group made up of the base group FG1 and the adjustment groups CG11 and CG21. Since the discharge candidate group is made up of a plurality of weighing hoppers 4 arranged continuously, the one adjustment group on the X1 direction side which is to be combined with the base group FG1 is limited to the adjustment group CG11 adjacent the base group FG1, and the one adjustment group on the X2 direction side which is to be combined with the base group FG1 is limited to the adjustment group CG21 adjacent the base group FG1. In the same manner, one adjustment group CG12 on the X1 direction side is combined with the base group FG2 and one adjustment group CG12 on the X2 direction side is combined with the base group FG2 to create a discharge candidate group made up of the base group FG2 and the adjustment groups CG22 and CG12. In this manner, in the second step S2, the two discharge candidate groups are found and determined as a second discharge candidate group set. Then, when m=2 (n=0) is set in third step S2, two adjustment groups CG11 and CG12 on the X1 direction side are combined with the base group FG1 and zero adjustment group on the X2 direction side is combined with the base group FG1 to create a discharge candidate group made up of the base group FG1 and the adjustment groups CG11 and CG12. In the same manner, the two adjustment groups CG21 and CG22 on the X1 direction side are combined with the base group FG2 and zero adjustment group on the X2 direction side is combined with the base group FG2 to create a discharge candidate group made up of the base group FG2 and the adjustment groups CG21 and CG22. In this manner, in the third step S2, the two discharge candidate groups are found and determined as a third discharge candidate group set.

As in the embodiments 1 and 2, in the processes (S2 to S4) of the repeat step S1, all the discharge candidate group sets may be first determined and the steps S3 and S4 may be performed with respect to each of the discharge candidate group sets, or otherwise all the discharge candidate group sets may be pre-stored in the memory of the control unit 20, and the steps S3 and S4 may be performed with respect to each of the discharge candidate group sets.

The embodiment 3 is identical to the embodiment 1 except for a part of the process in step S2 and a specific operation in the process in step S6. The specific operation of the process in step S6, i.e., switching of the discharge path in the step S6 is performed in such a manner that the control unit 20 controls the motor 33 to rotate the collecting funnels 7A and 7B in the configuration of FIG. 6. In a case where the discharge group A that discharges the objects to be weighed to the collecting funnel 7A which has been determined in step S5 includes the adjustment group CG1 and the discharge group B that discharges the objects to be weighed to the collecting funnels 7B which has been determined in step S5 includes the adjustment group CG2, the collecting funnel 7A is rotated to be positioned at a feed outlet 31a below the adjustment group CG1 and the collecting funnel 7B is rotated to be positioned at a feed outlet 31b below the adjustment group CG2 (state indicated by a solid line of FIG. 6(b)). Also, in a case where the discharge group A includes the adjustment group CG2 and the discharge group B includes the adjustment group CG1, the collecting funnel 7B is rotated to be positioned at the feed outlet 31a below the adjustment group CG1 and the collecting funnel 7A is rotated to be positioned at the feed outlet 31b below the adjustment group CG2 (state indicated by a broken line of FIG. 6(b)). The outlets 7a and 7b move according to the rotation of the collecting funnels 7A and 7B. So, inlets of packaging machines disposed below the outlets 7a and 7b are widened to be adapted to their moving ranges or otherwise small chutes adapted to the moving ranges of the outlets 7a and 7b are disposed so that the objects to be weighed traveling through the respective chutes may be respectively fed into the inlets of the packaging machines.

Figure 7A:
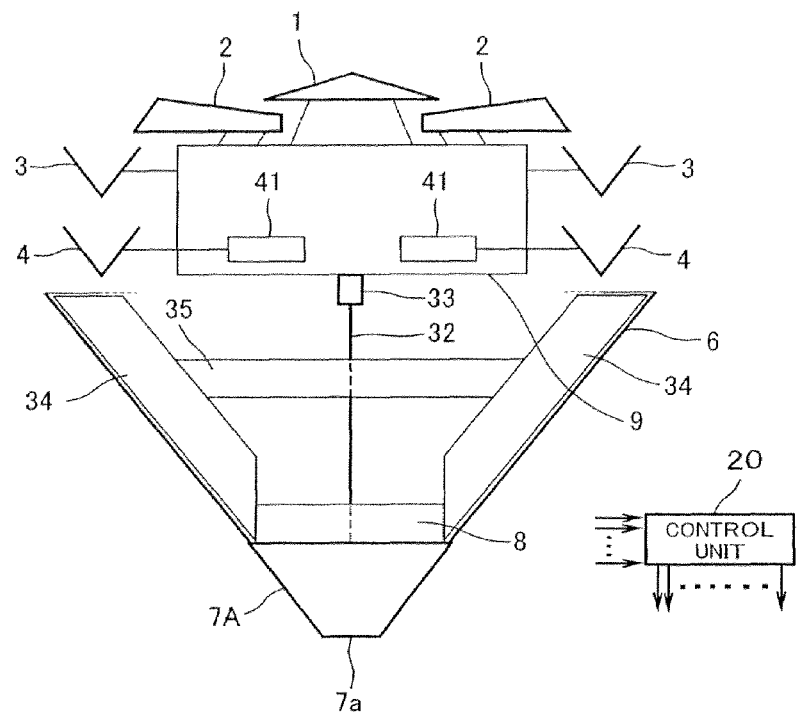
FIG. 7(a) is a schematic cross-sectional view of a combination weigher according to a second example of the embodiment 3 of the present invention as viewed from a lateral side.
Figure 7B:
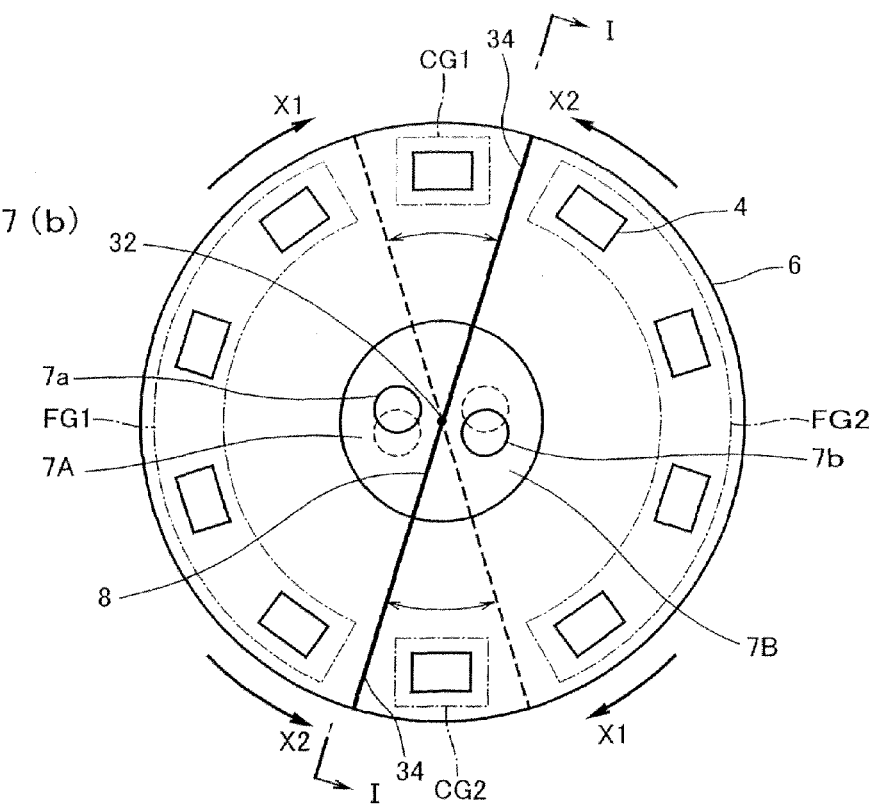
FIG. 7(b) is a schematic view of collecting chutes, collecting funnels, and others of the combination weigher as viewed from above.

A second example of the embodiment 3 of the present invention is shown in FIG. 7. FIG. 7(a) is a schematic cross-sectional view of a combination weigher according to the second example of the embodiment 3 of the present invention as viewed from a lateral side, and FIG. 7(b) is a schematic view of collecting chutes, collecting funnels, and others of the combination weigher as viewed from above. FIG. 7(a) shows a cross-section taken along line I-I of FIG. 7(b). In FIG. 7, the same reference numerals as those of FIG. 6 denote the same parts, which will not be further described.

The second example of this embodiment is identical to that of FIG. 6 in that the motor 33 causes the collecting funnels 7A and 7B to be rotated, but is distinct from that of FIG. 6 in that movable plates 34 for partitioning a space above the collecting chute 6 are attached to both sides of a separating plate 8 provided on a boundary between the collecting funnels 7A and 7B, instead of providing the separating plates 31 on the collecting chutes 6, as shown in FIG. 6. This enables the collecting funnels 7A and 7B, the separating plate 8, and the two movable plates 34 to be rotatable together. Whereas in this example, each movable plate 34 is fixedly mounted to a motor shaft 32 by a reinforcement plate 35, shapes such as widths of the movable plates 34, the reinforcement plate 35, and the separating plate 8 may be suitably changed.

The combination process and operation control executed by the control unit 20 in this example is identical to that of FIG. 6 except that the two movable plates 34 are rotatable together with the collecting funnels 7A and 7B as described above.

Although the discharge candidate group sets found to select the discharge groups are fewer than those of the embodiments 1 and 2, weighing precision in the combination in each discharge group is improved as a whole, as compared to the conventional example in which the discharge groups are fixed.

In the embodiments 1 to 3, a plurality of adjustment groups may be provided between the base groups, or one adjustment group may be made up of a plurality of weighing hoppers 4 arranged continuously. Furthermore, three or more base groups may be provided.

In the embodiments 1 to 3, the number of weighing hoppers 4 which are included in the respective base groups and participate in a combination is equal, but is not necessarily equal. Depending on the magnitude of the target weight discharged from each discharge group, the number of weighing hoppers 4 (the number of measured values used for the combination calculation) which are to be allocated to each base group may be determined. To be specific, the number of the weighing hoppers 4 which are allocated to the base group forming the discharge group whose target weight is large (small) may be determined to be large (small). In this case, depending on the number of weighing hoppers in the respective base groups, the shapes of the collecting funnels 7A and 7B disposed to correspond to the base groups are changed, and correspondingly mounting positions of the movable plates 10, the movable chutes 21, 21A, 21B, the separating plate 31, and the like are changed.

Figure 8:
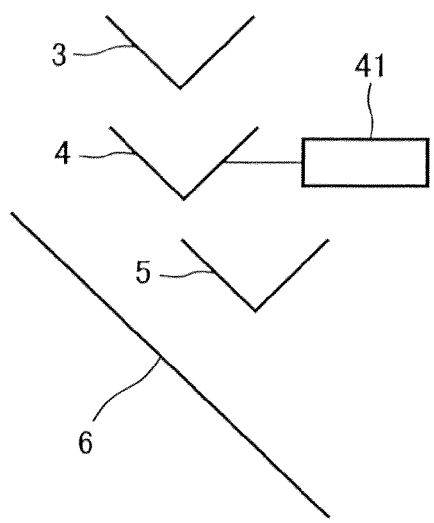
FIG. 8 is a schematic view showing another example of hoppers equipped in the combination weigher according to the embodiment of the present invention.

In the embodiments 1 to 3, the hoppers participating in the combination are only the weighing hoppers 4. Alternatively, as shown in FIG. 8, a memory hopper 5 may be disposed obliquely below each weighing hopper 4 to participate in a combination. In this case, the weighing hopper 4 is configured to be able to discharge the objects to be weighed selectively to the collecting chute 6 or to the memory hopper 5. When the memory hopper 5 becomes empty, the weighing hopper 4 feeds the objects to be weighed thereto. In this case, one adjustment group may be formed of each pair of corresponding weighing hopper 4 and memory hopper 5, and may be made up of a pair of corresponding weighing hopper 4 and memory hopper 5 or plural pairs of corresponding weighing hoppers 4 and memory hoppers 5 which are arranged continuously. The control unit 20 performs the combination process to determine discharge groups and to determine a combination of hoppers having an optimal combination weight from a plurality of weighing hoppers 4 and memory hoppers 5 in each discharge group, and causes the hoppers corresponding to that combination to discharge the objects to be weighed onto the collecting chute 6. As the weight of the objects to be weighed inside the memory hopper 5, the weight measured in the weighing hopper 4 located there above is used in the combination calculation.

For example, in order to achieve, in the configuration of FIG. 1, performance substantially equivalent to that in the configuration in which six weighing hoppers 4 are equipped in each of the base groups FG1 and FG2, it is necessary to provide three weighing hoppers 4 and three memory hoppers 5 in each of the base groups A to D, decreasing the number of expensive weight sensors 41 to half.

Figure 9:
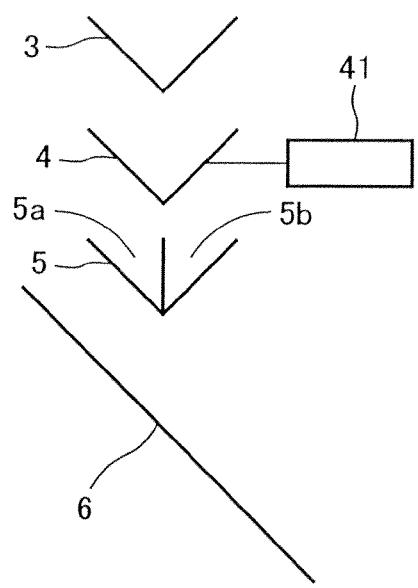
FIG. 9 is a schematic view showing another example of hoppers equipped in the combination weigher according to the embodiment of the present invention.

As shown in FIG. 9, each memory hopper 5 may be disposed immediately below the weighing hopper 4, and may be configured to have two accommodating chambers 5a and 5b. In this case, the weighing hopper 4 is configured to be able to discharge the objects to be weighed selectively to the accommodating chamber 5a or to the accommodating chamber 5b of the memory hopper 5 and not to discharge the objects to be weighed onto the collecting chute 6. The two accommodating chambers 5a and 5b of the memory hopper 5 are configured to be able to independently discharge the objects to be weighed. In this case, one adjustment group is made up of two accommodating chambers 5a and 5b of one memory hopper 5 or accommodating chambers 5a and 5b of a plurality of memory hoppers 5 arranged continuously. And, the combination calculation is performed based on, for example, the weights of the objects to be weighed inside the accommodating chambers 5a and 5b of each memory hopper 5. The accommodating chambers 5a and 5b participate in a combination and the weighing hopper 4 do not participate in the combination. As the weights of the objects to be weighed inside the accommodating chambers 5a and 5b, the weight measured in the weighing hopper located there above is used in the combination calculation. The weighing hopper 4 can participate in a combination provided that each weighing hopper 4 and the accommodating chamber 5a or 5b of the corresponding memory hopper 5 are selected simultaneously. For example, when the weighing hopper 4 and the accommodating chamber 5a of the corresponding memory hopper 5 are selected simultaneously, the objects to be weighed are discharged from the weighing hopper 4 onto the collecting chute 6 through the accommodating chamber 5a. In this case, the weighing hopper 4 is included in the adjustment group.

Figure 10:
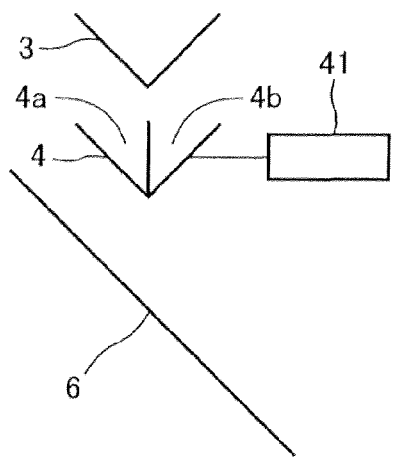
FIG. 10 is a schematic view showing another example of hoppers equipped in the combination weigher according to the embodiment of the present invention.

As shown in FIG. 10, each weighing hopper 4 may be configured to have two weighing chambers 4a and 4b. In this case, the feeding hopper 3 is configured to be able to discharge the objects to be weighed selectively to the weighing chamber 4a or to the weighing chamber 4b of the weighing hopper 4, and the two weighing chambers 4a and 4b of the weighing hopper 4 are configured to be able to independently discharge the objects to be weighed. In this case, one adjustment group is made up of the two weighing chambers 4a and 4b of one weighing hopper 4 or weighing chambers 4a and 4b of a plurality of weighing hoppers 4 arranged continuously. And, the combination calculation is performed based on the weights of the objects to be weighed inside the weighing chambers 4a and 4b of each weighing hopper 4, and the weighing chambers 4a and 4b participate in a combination. In each weighing hopper 4 having the two weighing chambers 4a and 4b, when the objects to be weighed are fed only to one of the weighing chambers, for example, the weighing chamber 4a, the weight sensor 41 measures a weight of the objects to be weighed inside the weighing chamber 4a. When the objects to be weighed are fed to the other weighing chamber 4b, the weight sensor 41 measures a total weight of the objects to be weighed inside the two weighing chambers 4a and 4b. The control unit 20 (see FIG. 1) calculates the weight of the objects to be weighed inside the weighing chamber 4b by subtracting the weight of the objects to be weighed inside the weighing chamber 4a from the total weight of the objects to be weighed inside the two weighing chambers 4a and 4b, and performs combination calculation.

Figure 11:
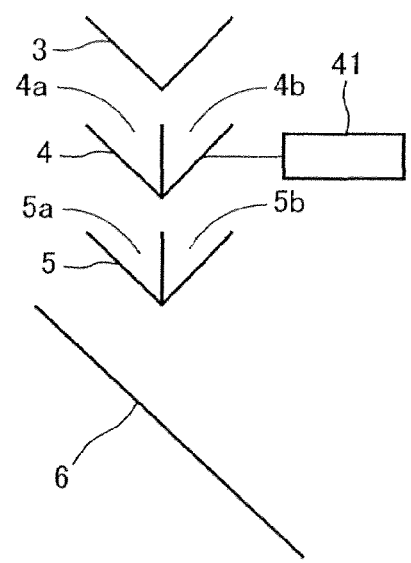
FIG. 11 is a schematic view showing another example of hoppers equipped in the combination weigher according to the embodiment of the present invention.

As shown in FIG. 11, each weighing hopper 4 may be configured to have the two weighing chambers 4a and 4b, and the memory hopper 5 having the two accommodating chambers 5a and 5b respectively corresponding to the weighing chambers 4a and 4b of the weighing hopper 4 may be disposed below each weighing hopper 4. In this case, the feeding hopper 3 is configured to be able to discharge the objects to be weighed selectively to the weighing chamber 4a or to the weighing chamber 4b of the weighing hopper 4. The weighing chamber 4a of the weighing hopper 4 discharges the objects to be weighed to the accommodating chamber 5a of the memory hopper 5, while the weighing chamber 4b of the weighing hopper 4 discharges the objects to be weighed to the accommodating chamber 5b of the memory hopper 5. In this case, one adjustment group is made up of two accommodating chambers 5a and 5b of one memory hopper 5 or accommodating chambers 5a and 5b of a plurality of memory hoppers 5 arranged continuously. And, the combination calculation is performed based on, for example, the weights of the objects to be weighed inside the accommodating chambers 5a and 5b of each memory hopper 5. The accommodating chambers 5a and 5b participate in a combination and the weighing hopper 4 does not participate in the combination. As the weights of the objects to be weighed inside the accommodating chambers 5a and 5b, the weights measured and calculated in the weighing chambers 4a and 4b located there above are used in the combination calculation. The weighing chambers 4a and 4b of the weighing hoppers 4 can participate in a combination provided that the weighing chambers 4a or 4b and the corresponding accommodating chamber 5a or 5b are selected simultaneously. For example, when the corresponding weighing chamber 4a and accommodating chamber 5a are selected simultaneously, the objects to be weighed are discharged from the weighing hopper 4a onto the collecting chute 6 through the accommodating chamber 5a. In this case, the weighing chambers 4a and 4b of the weighing hopper 4 are included in the adjustment group.

In the above case, in the configuration of FIGS. 9 and 11, the two accommodating chambers 5a and 5b of each memory hopper 5 are arranged in a direction perpendicular to the direction in which a plurality of memory hoppers 5 are arranged (in a radial direction relative to the memory hoppers 5 arranged circularly). Alternatively, the two accommodating chambers 5a and 5b may be arranged in the direction in which the plurality of memory hoppers 5 are arranged. Likewise, in the configuration of FIG. 10, the two weighing chambers 4a and 4b of each weighing hopper 4 are arranged in a direction perpendicular to the direction in which a plurality of weighing hoppers 4 are arranged (in the radial direction relative to the weighing hoppers 4 arranged circularly). Alternatively, the two weighing chambers 4a and 4b may be arranged in the direction in which the plurality of weighing hoppers 4 are arranged.

Figure 12:
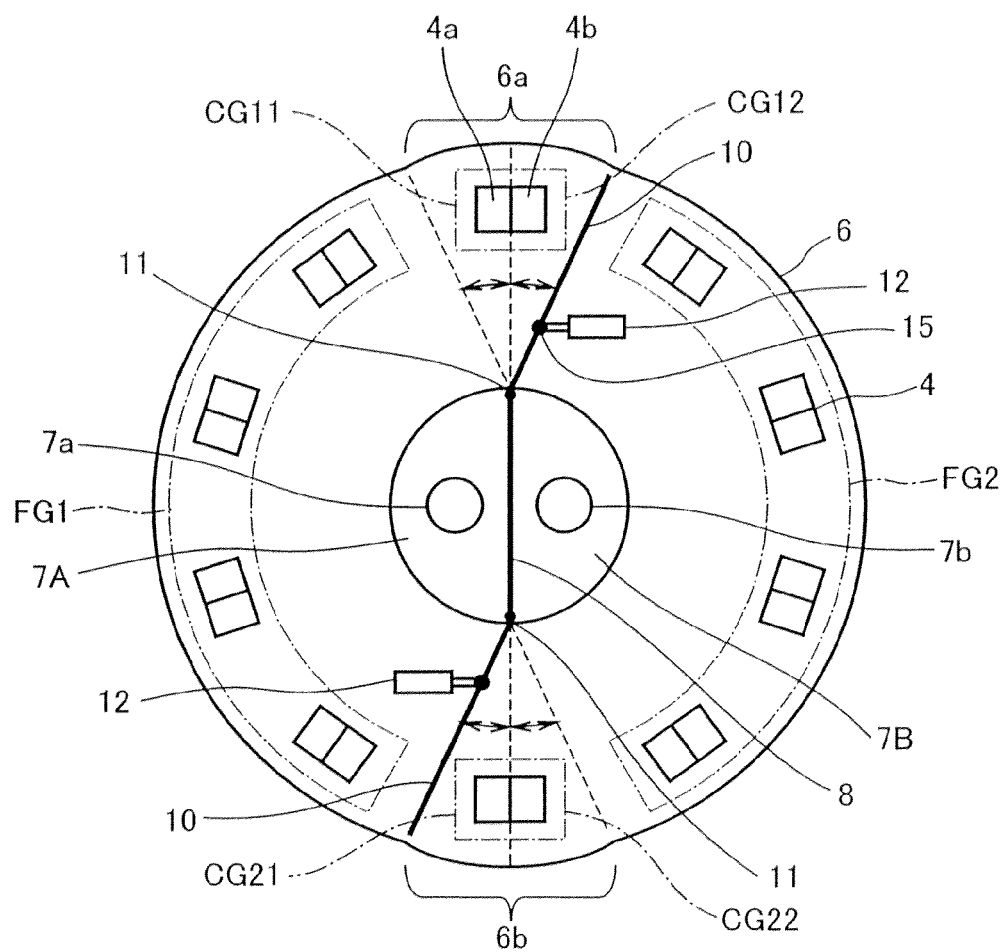
FIG. 12 is a schematic view of collecting chutes, collecting funnels, and others of combination weigher according to an example of the embodiment of the present invention, which is equipped with weighing hoppers each having two chambers, as viewed from above.

In a case where each weighing hopper 4 has two weighing chambers 4a and 4b which will participate in a combination as shown in FIG. 10 and the two weighing chambers 4a and 4b are arranged in the direction in which the plurality of weighing hoppers 4 are arranged as described above, each of the weighing chambers 4a and 4b may make up of the adjustment group (one or a plurality of weighing chambers may make up of one adjustment group.) An example in which such a configuration is applied to the embodiment 1 is shown in FIG. 12. FIG. 12 shows that in the embodiment 1, each weighing hopper 4 has two weighing chambers 4a and 4b, the two weighing chambers 4a and 4b are arranged in the direction in which the plurality of weighing hoppers 4 are arranged, the weighing chambers 4a and 4b of the weighing hopper 4 other than those of the base groups FG1 and FG2 are the adjustment groups CG11 and CG12, and the adjustment groups CG21 and CG22. Therefore, the movable plate 10 is movable for each set of the weighing chambers (4a, 4b). In this case, the discharge group A including the base group FG1 and the discharge group B including the base group FG2 which have been determined in step S5 (FIG. 3) of the combination process are discharge candidate groups in a set selected from nine discharge candidate group sets, as in the configuration of FIG. 5.

In the same manner, in a case where each memory hopper 5 has two accommodating chambers 5a and 5b which will participate in a combination as shown in FIGS. 9 and 11 and the two accommodating chambers 5a and 5b are arranged in the direction in which the plurality of memory hoppers 5 are arranged as described above, the accommodating chambers 5a and 5b may make up of the adjustment group (one or a plurality of accommodating chambers may make up of one adjustment group.) In this case, in the configuration of FIG. 12, for example, the weighing hopper 4 is replaced by the memory hopper 5 and the weighing chambers 4a and 4b are replaced by the accommodating chambers 5a and 5b (In this case, the weighing hopper 4 is disposed above the memory hopper 5). In this case, when the weighing hopper 4 disposed above the memory hopper 5 has two weighing chambers 4a and 4b as shown in FIG. 11, the weighing chambers 4a and 4b are arranged in the direction in which the plurality of weighing hoppers 4 are arranged, so as to respectively correspond to the accommodating chambers 5a and 5b. Whereas in the configuration of FIG. 12, the configuration of the embodiment 1 is used as the discharge path switching chute, the configuration of the embodiment 2 or the configuration of the embodiment 3 may be used. It should be noted that when the configuration of the embodiment 3 is used, the number of combination groups from which the discharge groups A and B will be selected are limited as described above.

Figure 13:
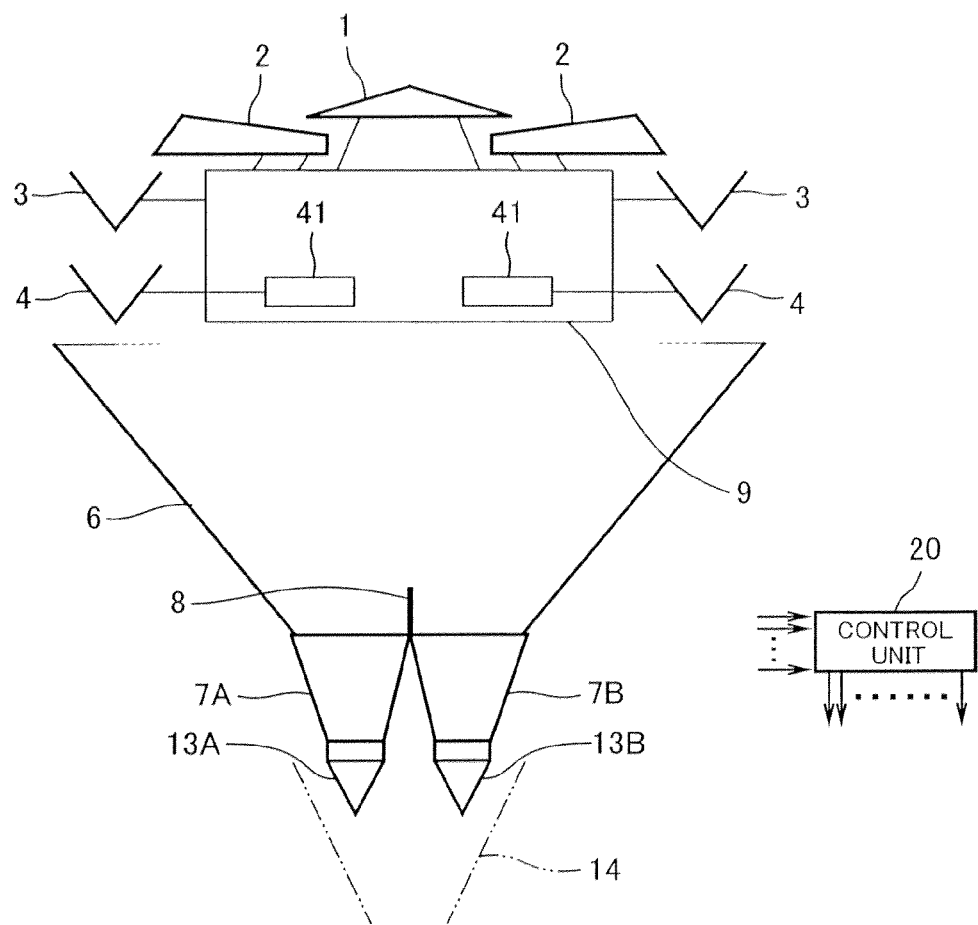
FIG. 13 is a schematic cross-sectional view of an example of the combination weigher according to the embodiment of the present invention which is equipped with collecting hoppers, as viewed from a lateral side.

Whereas in the above described embodiments 1 to 3, the objects to be weighed discharged from the collecting funnels 7A and 7B are fed into the two packaging machines disposed to respectively correspond to the collecting funnels 7A and 7B, they may alternatively be fed into one packaging machine. The configuration in this case is shown in FIG. 13. Collecting hoppers 13A and 13B are respectively provided at outlets of the collecting funnels 7A and 7B and a lower chute 14 is provided below the collecting hoppers 13A and 13B to feed the objects to be weighed discharged from the two collecting hoppers 13A and 13B into one packaging machine which is not shown. If the objects to be weighed from the two collecting hoppers 13A and 13B can be fed into one packaging machine without the lower chute 14, it may be omitted. When the objects to be weighed are fed into one packaging machine in this way, they are discharged simultaneously from hoppers forming optimal combinations of the discharge groups A and B and are stored in the collecting hoppers 13A and 13B. Every time the control unit 20 receives a feed command signal from, for example, the packaging machine, it selects one collecting hopper (13A, 13B) and causes the selected collecting hopper to open its gate to discharge the objects to be weighed and to feed them into the packaging machine. In other words, every time the control unit 20 receives the feed command signal from the packaging machine, the objects to be weighed having the optimal combination weight in each discharge group are discharged. The sequence in which the gates of the collecting hoppers 13A and 13B are opened may be determined in advance. In this way, by configuring so that the objects to be weighed into one packaging machine, they can be discharged at a speed twice higher than that of the configuration in which they are fed into the two packaging machines.

The dispersion feeder 1, the linear feeders 2, and the feeding hoppers 3 in the combination weighers of the embodiments 1 to 3 are not intended to be limited in configuration to the above. They may be constructed in other ways depending on the type of the objects to be weighed such as powder or chunks so long as feeding means capable of feeding the objects to be weighed to the weighing hopper 4 is equipped.

In the embodiments 1 to 3, the weighing hoppers and others in the combination weighers are arranged circularly. In contrast, in embodiments 4 to 6 described below, the weighing hoppers and others may be arranged in a straight line shape.

Embodiment 4

Figure 14A:
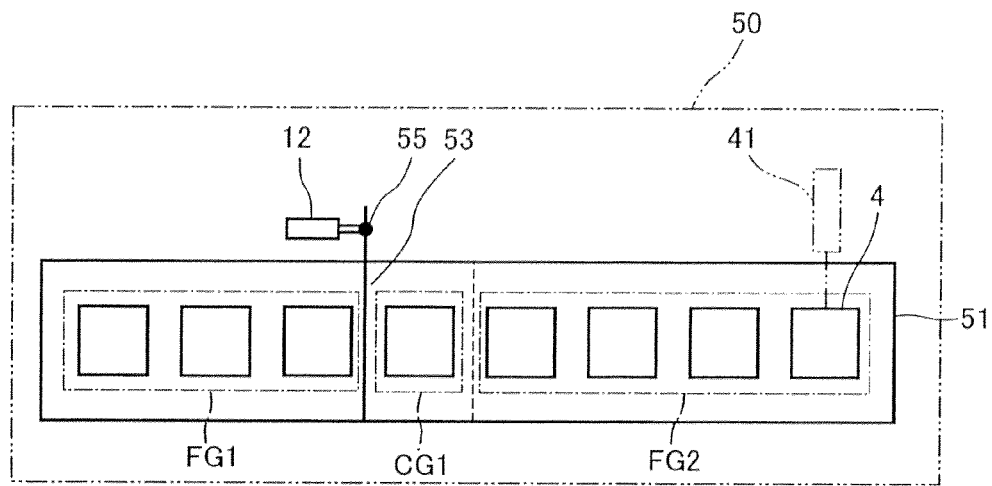
FIG. 14(a) is a schematic view of a combination weigher according to an example of an embodiment 4 of the present invention as viewed from above.

FIG. 14(a) is a schematic view of a combination weigher according to an example of an embodiment 4 of the present invention as viewed from above, and FIG. 14(b) is a schematic cross-sectional view of the combination weigher as viewed from a lateral side.

Figure 14:
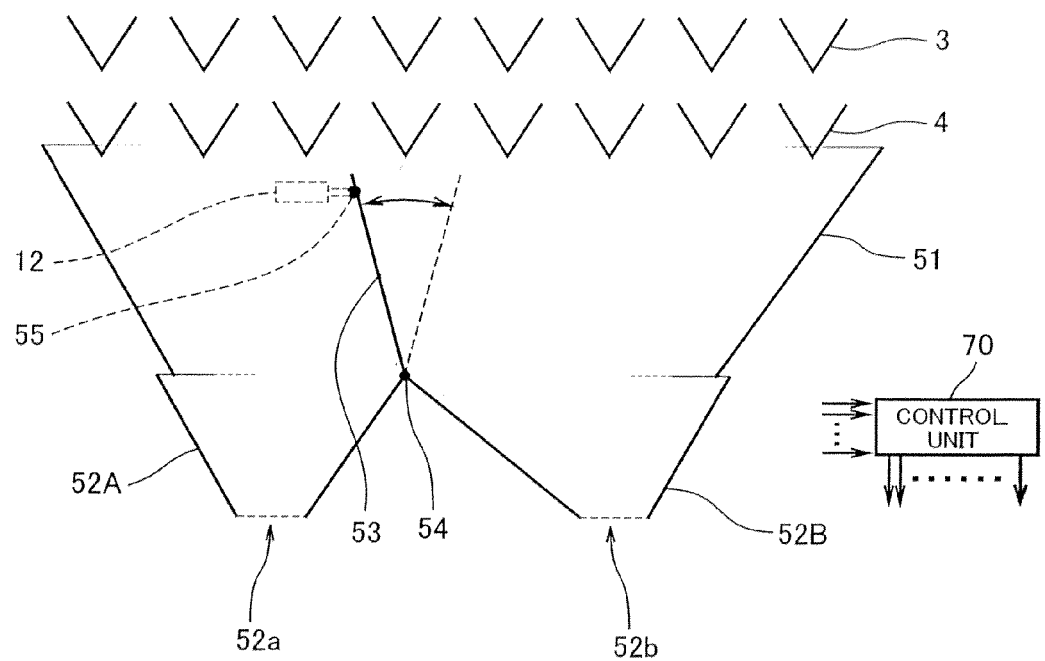
FIG. 14(b) is a schematic cross-sectional view of the combination weigher as viewed from a lateral side.

The combination weigher is constructed in such a manner that a plurality of feeding hoppers 3 and weighing hoppers 4 are arranged to correspond to each other and in straight line shapes. The feeding hoppers 3 and the weighing hoppers 4 are disposed inside a base body (body) 50 of a substantially rectangular parallelepiped shape, and drive units therefore (gate opening and closing units of the feeding hoppers 3 and the weighing hoppers 4 or the like) are accommodated in the base body 50. Each weighing hopper 4 is attached with a weight sensor 41 such as a load cell, which measures the weight of the objects to be weighed inside the weighing hopper 4. The weight sensors 41 are accommodated along with the drive units in the base body 50. FIG. 14(*a*) does not show the feeding hoppers 3, which are disposed immediately above the weighing hoppers 4. The base body 50 opens at an upper surface thereof above the collecting chute 51, and the feeding hoppers 3 are arranged in the vicinity of the opening. The objects to be weighed are fed into each feeding hopper 3 from, for example, a feeder which is not shown.

A collecting chute 51 of an inverted frustum shape with a rectangular cross-section is disposed below the weighing hoppers 4 arranged in the straight line shape. Two collecting funnels 52A and 52B are disposed under the collecting chute 51 so that the objects to be weighed sliding down on the collecting chute 51 are gathered and discharged from outlets 52*a* and 52*b*. The collecting funnels 52A and 52B open at their upper parts in rectangular shape and have at their lower parts the outlets 52*a* and 52*b* formed by circular openings.

In addition, a movable plate 53 is provided to partition an interior of the collecting chute 51. A fixed shaft 54 is attached onto a boundary between upper parts of the collecting funnels 52A and 52B, and the movable plate 53 is rotatably mounted to the fixed shaft 54 by a hinge and others. The movable plate 53 is actuated by the air cylinder 12 controlled by the control unit 70 so as to be rotated around the fixed shaft 54. The air cylinder 12 is fixedly mounted in the interior of the base body 50. At a coupling portion 55 where the piston rod of the air cylinder 12 and the movable plate 53 are coupled to each other, the piston rod of the air cylinder 12 is mounted to the movable plate 53 so as to be pivotable in a direction perpendicular to the movable plate 50. The coupling portion 55 is vertically slidable along a surface of the movable plate 53. In such a configuration, the piston rod moves forward and backward to cause the movable plate 53 to be rotated around the fixed shaft 54. In FIG. 14(*b*), a solid line indicates the position of the movable plate 53 when the piston rod is in a retracted position, and a broken line indicates the position of the movable plate 53 when the piston rod is in a backward position. Depending on the position of the movable plate 53, the objects to be weighed are discharged from the weighing hoppers 4 in the adjustment group CG1 to the collecting funnel 52A or to the collecting funnel 52B.

The weighing hoppers 4 arranged in the straight line shape are divided into a plurality of base groups FG1 and FG2 and an adjustment group CG1 between them. The base group FG1 is made up of the weighing hoppers 4 which discharge the objects to be weighed which travel through the collecting funnel 52A, and the base group FG2 is made up of the weighing hoppers 4 which discharge the objects to be weighed which travel through the collecting funnel 52B. The adjustment group CG1 is made up of the weighing hoppers 4 which discharge the objects to be weighed which travel through the collecting funnel 52A or 52B depending on the position of the movable plate 53. When the movable plate 53 is in a position indicated by the solid line of FIG. 14(*b*), the objects to be weighed discharged from the weighing hopper 4 in the adjustment group CG1 travel through the collecting funnel 52B, while when the movable plate 52 is in a position indicated by the broken line, the objects to be weighed travel through the collecting funnel 52A. Whereas one adjustment group is provided between the base groups FG1 and FG2, a plurality of adjustment groups may be provided. In this case, the movable plate 53 is controlled to be movable and be stoppable for each adjustment group. Furthermore, whereas the adjustment group CG1 is made up of one weighing hopper 4, it may be made up of a plurality of weighing hoppers 4 arranged continuously. For example, when the two weighing hoppers 4 are one adjustment group, the movable plate 53 is controlled to be movable and stoppable for each set of the two weighing hoppers 4.

The control unit 70 controls the operation of the entire combination weigher and performs the combination process as in the embodiment 1. In this combination process, the adjustment group CG1 is combined with either one of the base groups FG1 and FG2 at both sides to determine a plurality of discharge groups each including one base group and made up of the weighing hoppers 4 arranged continuously. When each discharge group is determined, the combination calculation is performed based on the measured values (weights of the objects to be weighed measured by the weight sensors 41) of the weighing hoppers 4 in that discharge group to determine a combination (optimal combination) of hoppers which will discharge the objects to be weighed from the weighing hoppers 4 belonging in that discharge group. In this embodiment, a discharge group (hereinafter referred to as a discharge group A) including the base group FG1 and a discharge group (hereinafter referred to as a discharge group B) including the base group FG2 are determined, and the movable plate 53 is moved to a boundary between the discharge group A and the discharge group B. For example, in a case where FIG. 14(*b*) shows the state where the movable plate 53 is moved to the boundary between the discharge group A and the discharge group B, it is determined that the discharge group A consists of the base group FG1 and the discharge group B is made up of the base group FG2 and the adjustment group CG1. The objects to be weighed discharged from the weighing hoppers 4 forming the optimal combination of the discharge group A are gathered to the collecting funnel 52A and are discharged from the outlet 52*a*, while the objects to be weighed discharged from the weighing hoppers 4 forming the optimal combination of the discharge group B are gathered to the collecting funnel 52B and are discharged from the outlet 52*b*.

Two packaging machines which are not shown are disposed below the combination weigher. The objects to be weighed which have been discharged from the outlet 52*a* of the collecting funnel 52A are fed into one of the packaging machines, and the objects to be weighed which have been discharged from the outlet 52*b* of the collecting funnel 52B are fed into the other packaging machine. The collecting chute 51, the collecting funnels 52A and 52B, the movable plates (53, 54, 12) and others form discharge path switching chutes.

The operation of the combination weigher of this embodiment is shown in the flowchart of FIG. 3 as in the embodiment 1, and will not be described. In this embodiment, the discharge path is switched by the process of step S6 of FIG. 3 in such a manner that the control unit 70 controls the air cylinder 12 to rotate the movable plate 53.

Whereas the movable plate 53 is actuated by the air cylinder 12 to be rotated, this is merely exemplary. For example, the fixed shaft 54 may be replaced by a rotational shaft to which the movable plate 53 is fixedly mounted, a bearing may be mounted at one end of the rotational shaft and an opposite end of the rotational shaft may be coupled to a motor shaft of a motor (stepping motor) so that the motor rotates the rotational shaft to operate the movable plate 53 in the same manner.

As should be appreciated from above, in this embodiment, the configuration using the movable plate 10 in the embodiment 1 is applied to the combination weigher in which the weighing hoppers 4 are arranged in the straight line shape, and effects similar to those of the embodiment 1 are obtained.

Embodiment 5

Figure 15A:
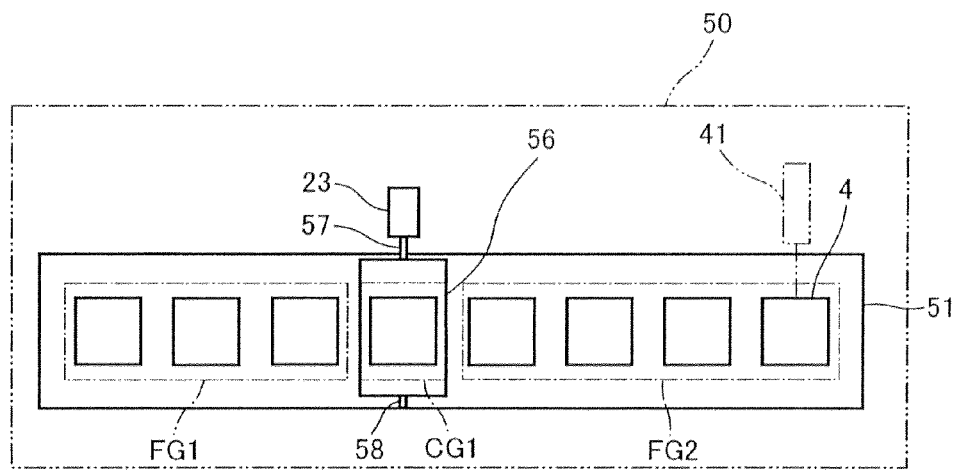
FIG. 15(a) is a schematic view of a combination weigher according to an example of an embodiment 5 of the present invention as viewed from above.
Figure 15B:
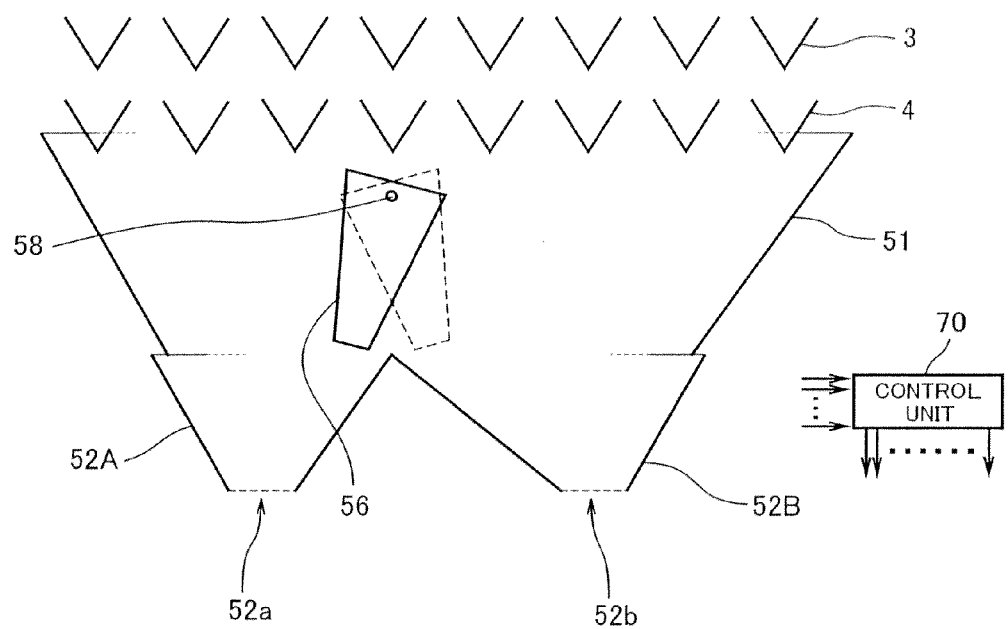
FIG. 15(b) is a schematic cross-sectional view of the combination weigher as viewed from a lateral side.

FIG. 15(*a*) is a schematic view of a combination weigher according to an example of an embodiment 5 of the present invention as viewed from above, and FIG. 15(*b*) is a schematic cross-sectional view of the combination weigher as viewed from a lateral side. In FIG. 15, the same reference numerals as those of FIG. 14 denote the same parts, which will not be described.

A significant distinction between this embodiment and the embodiment 4 is that the movable plate 53 of the embodiment 4 is replaced by a movable chute 56. The movable chute 56 is formed of a tubular member with a rectangular cross-section. The movable chute 56 is disposed below the weighing hopper 4 of the adjustment group CG1 within the collecting chute 51. The movable chute 56 receives the objects to be weighed discharged from the weighing hopper 4 of the adjustment group CG1 through an opening at an upper part thereof and discharges them to the collecting funnel 52A or 52B through an opening (feed outlet) at a lower end thereof. The movable chute 56 is rotated by, for example, a motor 23 so that its feed outlet is directed toward the collecting funnel 52A or toward the collecting funnel 52B. To this end, the movable chute 56 is coupled at its side surface to a motor shaft 57, and a mounting portion 58 is provided on an opposite side surface of the movable chute 56 in a position on an extended line of the motor shaft 57 to mount the movable chute 56 to the collecting chute 51 such that the movable chute 56 is rotatable at the mounting portion 58. For example, a short shaft may protrude from the opposite surface of the movable chute 56 in the position on the extended line of the motor shaft 57 toward the collecting chute 51, and a bearing or a shaft hole to receive the shaft may be provided on the collecting chute 51.

The operation of the combination weigher of this embodiment is shown in the flowchart of FIG. 3 as in the embodiments 1, 2, and 4.

The operation of this embodiment is distinct from the operation of the embodiment 4 only in a specific operation in the process of step S6. To be specific, since the movable plate 53 of the embodiment 4 is replaced by the movable chute 56, the discharge path is switched in step S6 of this embodiment in such a manner that the control unit 70 controls the motor 23 to rotate the movable chute 56. When the discharge group A which discharges the objects to be weighed to the collecting funnel 52A which has been determined in step S5 includes the adjustment group CG1 (when the discharge group B which discharges the objects to be weighed to the collecting funnel 52B does not include the adjustment group CG1), the feed outlet of the movable chute 56 below the adjustment group CG1 is rotated to be directed toward the collecting funnel 52A, while when the discharge group A does not include the adjustment group CG1 (when the discharge group B includes the adjustment group CG1), the feed outlet of the movable chute 56 is rotated to be directed toward the collecting funnel 52B.

In this embodiment, the configuration using the movable chute 21 of the embodiment 2 is applied to the combination weigher in which the weighing hoppers 4 are arranged in the straight line shape, and effects similar to those of the embodiment 2 are obtained.

Embodiment 6

Figure 16A:
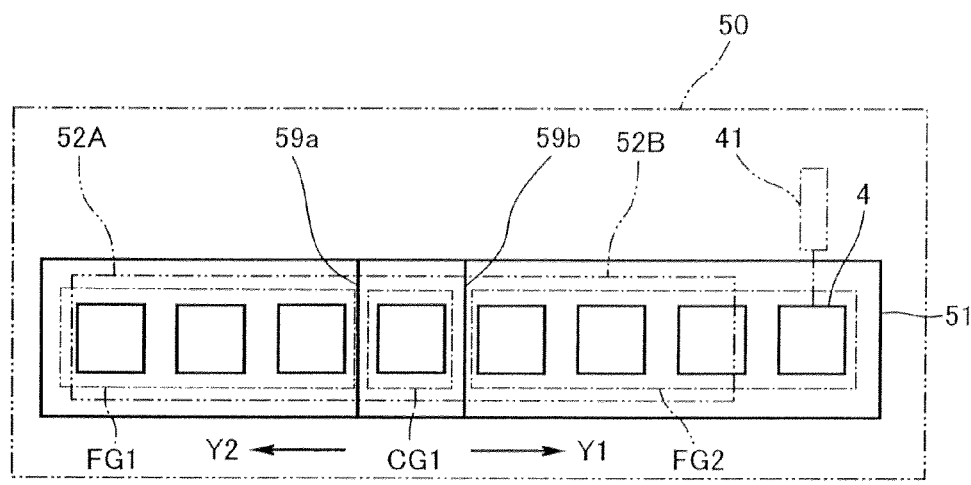
FIG. 16(a) is a schematic view of a combination weigher according to a first example of an embodiment 6 of the present invention as viewed from above.
Figure 16B:
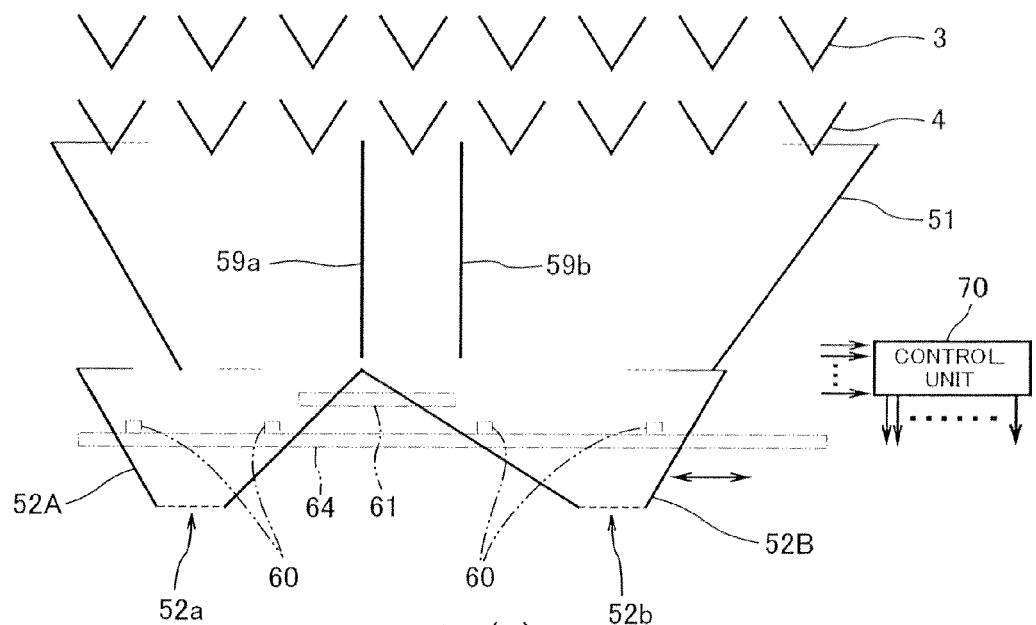
FIG. 16(b) is a schematic cross-sectional view of the combination weigher as viewed from a lateral side.
Figure 16C:
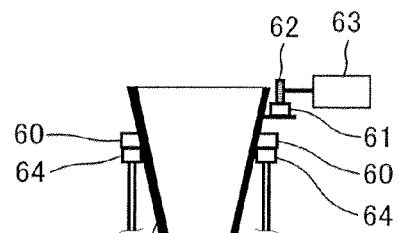
FIG. 16(c) is a schematic cross-sectional view showing collecting funnels of the combination weigher and their vicinity.

FIG. 16(*a*) is a schematic cross-sectional view of a combination weigher according to a first example of an embodiment 6 of the present invention as viewed from above, FIG. 16(*b*) is a schematic cross-sectional view of the combination weigher as viewed from a lateral side, and FIG. 16(*c*) is a schematic cross-sectional view showing a collecting funnel and its vicinity of the combination weigher as viewed from a direction different from that of FIG. 16(*b*). In FIG. 16, the same reference numerals as those of FIG. 14 denote the same parts, which will not be described.

A significant distinction between the first example of this embodiment and the embodiment 4 is that the movable plate 53 of the embodiment 4 is replaced by separating plates 59*a* and 59*b* which are fixedly mounted inside the collecting chute 51 to form within the collecting chute 51 a path exclusive for the objects to be weighed discharged from each adjustment group and the two collecting funnels 52A and 52B are movable in the direction (line direction) in which the weighing hoppers 4 are arranged. In this embodiment, to move the collecting funnels 52A and 52B, roller bearings 60 are mounted to opposite side surfaces of the collecting funnels 52A and 52B to enable the funnels 52A and 52B to be moved on a rail 64 and a rack (gear of straight-line teeth shape) 61 is mounted to one side surfaces of the collecting funnels 52A and 52B. A spur gear 62 which meshes with the rack 61 is mounted to a shaft of the motor 63 fastened by a fastening means which is not shown and the spur gear 62 is caused to perform positive rotation or reverse rotation by the motor 63 so that the collecting funnels 52A and 52B are moved together with the rack 61 in the direction in which the weighing hoppers 4 are arranged. The motor 63 is controlled by the control unit 70.

The combination process performed by the control unit 70 in this embodiment is similar to that performed by the control unit 20 in the embodiment 3. Therefore, regardless of whether the number of base groups is two as shown in FIG. 16 or the number of base groups is three or more, the number of adjustment groups disposed between the base groups is equal (k), and a part of the process in step S2 in the flowchart of FIG. 3 is different. To be specific, in the process of step S2, the adjustment groups present on the side of a first line direction in which the plurality of weighing hoppers 4 are arranged are combined with the respective base groups in equal number (m: m is 0 to k) and the adjustment groups present on the side of a second line direction opposite to the first line direction are combined with the respective base groups in equal number (n: n=k−m). Thereby, discharge candidate groups are found and determined as a discharge candidate group set. One value of m (n) is used in every process of the step S2 repeated and is changed every time the step S2 is repeated within the repeat step S1, and the repeat step S1 is terminated when all values (integers) from 0 to k have been used as m.

In the configuration of FIG. 16, k=1, the first line direction is Y1 direction, the second line direction is Y2 direction, and m=0, 1 (n=1, 0). In this configuration, the adjustment group is present only on one side of each of the base groups FG1 and FG2. In this case, for example, when m=0 (n=1) is set in first step S2, zero adjustment group on the Y1 direction side is combined with the base group FG1 and no adjustment group is present on the Y2 direction side of the base group FG1, so that a discharge candidate group consisting of the base group FG1 is created. In the same manner, no adjustment group is present on the Y1 direction side of the base group FG2 and one adjustment group on the Y2 direction side is combined with the base group FG2, so that a discharge candidate group consisting of the base group FG2 and the adjustment group CG1 is created. In this manner, in the first step S2, the two discharge candidate groups are found and determined as a first discharge candidate group set. Then, when m=1 (n=0) is set in second step S2, one adjustment group CG1 on the Y1 direction side is combined with the base group FG1 and no adjustment group is present on the Y2 direction side of the base group FG1, so that a discharge candidate group made up of the base group FG1 and the adjustment group CG1 is created. In the same manner, no adjustment group is present on the Y1 direction side of the base group FG2 and zero adjustment group CG1 on the Y2 direction side is combined with the base group FG2, so that a discharge candidate group consisting of the base group FG2 is created. In the manner described above, the two discharge candidate groups are found and determined as a second discharge candidate group set in second step S2.

In this embodiment, consider a case where there are three base groups FG1, FG2, and FG3, two adjustment groups CG1 and CG2 are present between the base groups FG1 and FG2, and two adjustment groups CG3 and CG4 are present between the base groups FG2 and FG3. In this case, three discharge groups each including the base group are determined, three collecting funnels are disposed to receive the objects to be weighed discharged from respective discharge groups, and packaging machines are respectively disposed below the collecting funnels. The groups are arranged in straight line shape in the following order: FG1, CG1, CG2, FG2, CG3, CG4, and FG3, the direction from FG1 to FG3 is Y1 direction which is a first line direction, and an opposite direction is Y2 direction which is a second line direction. In this case, the number k of the adjustment groups disposed between the base groups is k=2, m=0, 1, 2 (n=2, 1, 0). In this case, for example, when m=0 (n=2) is set in first step S2, zero adjustment group on the Y1 direction side is combined with the base group FG1 and no adjustment group is present on the Y2 direction side of the base group FG1, so that a discharge candidate group made up of the base group FG1 is created. In the same manner, zero adjustment group on the Y1 direction side is combined with the base group FG2 and two adjustment groups CG1 and CG2 on the Y2 direction side are combined with the base group FG2, so that a discharge candidate group made up of the base group FG2 and the adjustment groups CG1 and CG2 is created. In the same manner, no adjustment group is present on the Y1 direction side of the base group FG3 and two adjustment groups CG3 and CG4 on the Y2 direction side are combined with the base group FG3, so that a discharge candidate group made up of the base group FG3 and the adjustment groups CG3 and CG4 is created. In this manner, in the first step S2, the above three discharge candidate groups are found and determined as a first discharge candidate group set.

Then, when m=1 (n=1) is set in second step S2, one adjustment group CG1 on the Y1 direction side is combined with the base group FG1 and no adjustment group is present on the Y2 direction side of the base group FG1, so that a discharge candidate group made up of the base group FG1 and the adjustment group CG1 is created. In the same manner, one adjustment group CG3 on the Y1 direction side is combined with the base group FG2 and one adjustment group CG2 on the Y2 direction side is combined with the base group FG2, so that a discharge candidate group made up of the base group FG2 and the adjustment groups CG2 and CG3 is created. In the same manner, no adjustment group is present on the Y1 direction side of the base group FG3 and one adjustment group CG4 on the Y2 direction side is combined with the base group FG3, so that a discharge candidate group made tip of the base group FG3 and the adjustment group CG4 is created. In this manner, in the second step S2, the above three discharge candidate groups are found and determined as a second discharge candidate group set.

Then, when m=2 (n=0) is set in third step S2, two adjustment groups CG1 and CG2 on the Y1 direction side are combined with the base group FG1 and no adjustment group is present on the Y2 direction side of the base group FG1, so that a discharge candidate group made up of the base group FG1 and the adjustment groups CG1 and CG2 is created. In the same manner, two adjustment groups CG3 and CG4 on the Y1 direction side are combined with the base group FG2 and zero adjustment group on the Y2 direction side is combined with the base group FG2, so that a discharge candidate group made up of the base group FG2 and the adjustment groups CG3 and CG4 is created. In the same manner, no adjustment group is present on the Y1 direction side of the base group FG3 and zero adjustment group on the Y2 direction side is combined with the base group FG3, so that a discharge candidate group consisting of the base group FG3 is created. In this manner, in the third step S2, the above three discharge candidate groups are found and determined as a third discharge candidate group set.

As described above, the embodiment 6 is identical to the embodiment 4 except for a part of the process of step S2 and a specific operation in the process of step S6. The specific operation in the process of step S6, that is, switching of the discharge path in step S6 in the configuration of FIG. 16 of this embodiment is carried out in such a manner that the control unit 70 controls the motor 63 to move the collecting funnels 52A and 52B. When the discharge group A that discharges the objects to be weighed to the collecting funnel 52A which has been determined in step S5 includes the adjustment group CG1, the collecting funnels 52A and 52B are moved so that the boundary between the collecting funnels 52A and 52B is positioned immediately below the separating plate 59a (state indicated by FIG. 16(b)). When the discharge group B that discharges the objects to be weighed to the collecting funnel 52B includes the adjustment group CG1, the collecting funnels 52A and 52B are moved so that the boundary between the collecting funnels 52A and 52B is positioned immediately below the separating plates 59b. The outlets 52a and 52b move according to the movement of the collecting funnels 52A and 52B. So, inlets of packaging machines disposed below the outlets 52a and 52b may be widened to be adapted to their moving ranges, or otherwise small chutes adapted to the moving ranges of the outlets 52a and 52b may be disposed so that the objects to be weighed traveling through the respective chutes may be respectively fed into the inlets of the packaging machines.

Figure 17A:
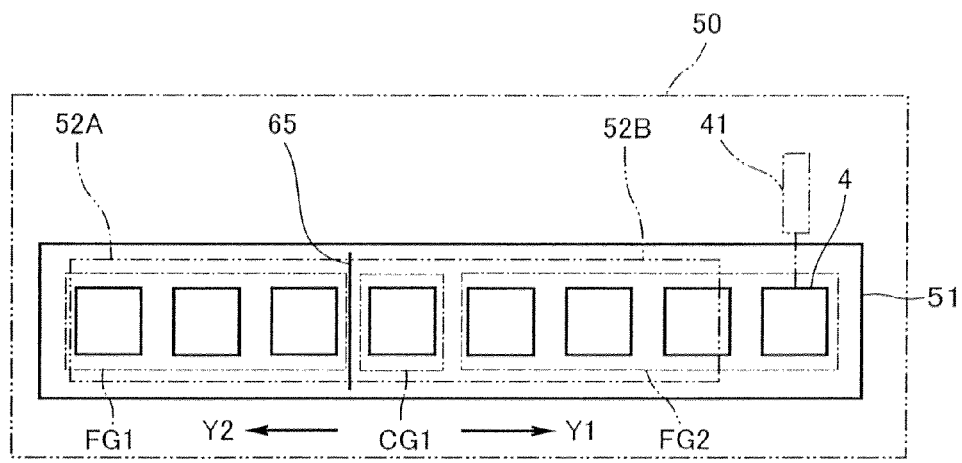
FIG. 17(a) is a schematic view of a combination weigher according to a second example of the embodiment 6 of the present invention as viewed from above.
Figure 17B:
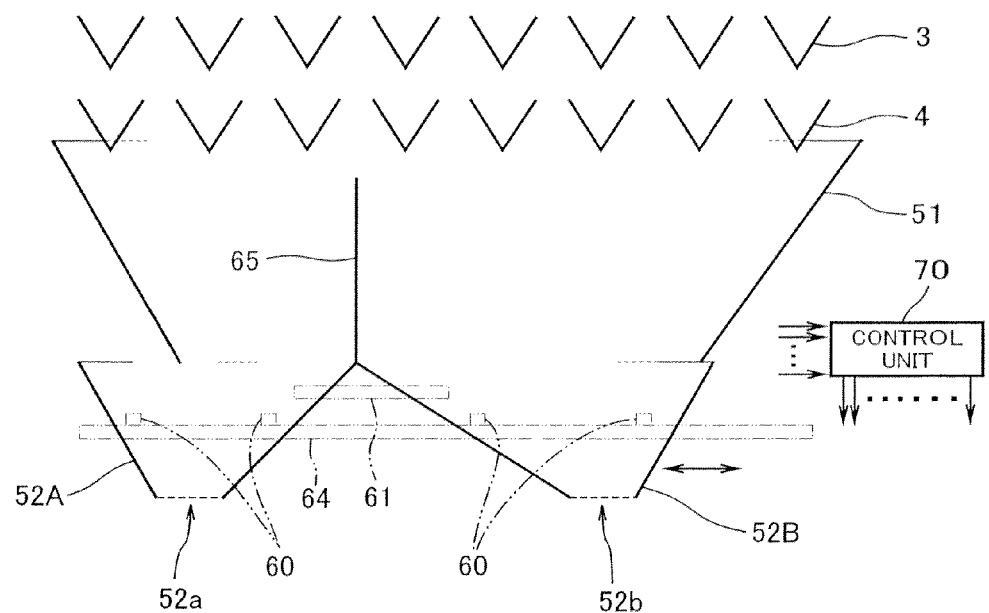
FIG. 17(b) is a schematic cross-sectional view of the combination weigher as viewed from a lateral side.
Figure 17C:
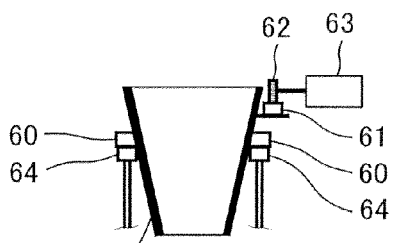
FIG. 17(c) is a schematic cross-sectional view showing collecting funnels of the combination weigher and their vicinity.

FIG. 17(a) is a schematic cross-sectional view of a combination weigher according to a second example of the embodiment 6 of the present invention as viewed from above, FIG. 17(b) is a schematic cross-sectional view of the combination weigher as viewed from a lateral side, and FIG. 17(c) is a schematic cross-sectional view showing collecting funnels and their vicinity of the combination weigher as viewed from a direction different from that of FIG. 17(b). In FIG. 17, the same reference numerals as those of FIG. 16 denote the same parts, which will not be described.

The second example of this embodiment is identical to that of FIG. 16 in that the motor 63 causes the collecting funnels 52A and 52B to be moved, but a movable plate 65 is fastened onto the boundary between the collecting funnels 52A and 52B to partition an interior of the collecting chute 51 instead of providing the separating plates 59a and 59b on the connecting chute 51 as shown in FIG. 16. Thereby, the movable plate 65 is movable together with the collecting funnels 52A and 52B.

The combination process and operation control executed by the control unit 70 in this example are identical to those of FIG. 16 except that the movable plate 65 is movable together with the collecting funnels 52A and 52B as described above.

In the first example of this embodiment, the configuration in the first example of the embodiment 3 in which the fixing plates 31 are provided and the collecting funnels 7A and 7B are rotated is applied to the combination weigher in which the weighing hoppers 4 are arranged in straight line shape. In the second example of this embodiment, the configuration in the second example of the embodiment 3 in which the movable plates 35 are provided and are rotated with the collecting funnels 7A and 7B is applied to the combination weigher in which the weighing hoppers 4 are arranged in straight line shape. Therefore, in this embodiment, the effects similar to those of the third embodiment are obtained.

In the above embodiments 4 to 6, as in the embodiments 1 to 3, the processes in the repeat step S1 (S2 to S4) may be performed in such a manner that all discharge candidate group sets are first determined and then the steps S3 and S4 are performed with respect to each discharge candidate group set, or otherwise all the discharge candidate group sets are pre-stored in the memory of the control unit 70 and the steps S3 and S4 may be performed with respect to each discharge candidate group set.

In the above embodiments 4 to 6, as in the embodiments 1 to 3, a plurality of adjustment groups may be provided between the base groups and one adjustment group may be made up of a plurality of weighing hoppers 4 arranged continuously. Also, there may be provided three or more base groups. Depending on the magnitude of the target weight discharged from each discharge group, the number of weighing hoppers 4 (the number of measured values used in the combination calculation) which are to be allocated to each base group may be determined.

As in the embodiments 1 to 3, the hoppers may be configured as shown in FIG. 8 to 12, and the combination process may be performed in a manner adapted to those hopper configurations. As in the embodiments 1 to 3, when each weighing hopper 4 has two weighing chambers 4a and 4b which will participate in a combination as shown in FIG. 10 and the two weighing chambers 4a and 4b are arranged in the direction in which the plurality of weighing hoppers 4 are arranged, each of the weighing chambers 4a and 4b may make up of the adjustment group. Likewise, when each memory hopper 5 has two accommodating chambers 5a and 5b which will participate in a combination as shown in FIGS. 9 and 11, and the two accommodating chambers 5a and 5b are arranged in the direction in which the plurality of memory hoppers 5 are arranged, each of the accommodating chambers 5a and 5b may make up of the adjustment group.

Furthermore, as in the embodiments 1 to 3 as shown in FIG. 13, collecting hoppers may be provided at the outlets 52a and 52b of the collecting funnels 52A and 52B to feed the objects to be weighed into one packaging machine.

In the above described embodiments 1 to 6, when the hopper configurations shown in FIGS. 8 to 10 are used, hoppers or chambers which cannot be used in next combination calculation may occur depending on a combination of the hoppers or chambers which are selected in combination calculation. In the configuration of FIG. 8, if the weighing hopper 4 and the memory hopper 5 which are arranged in upper and lower position to form a pair are selected simultaneously to form a combination and discharge the objects to be weighed, the weighing hopper 4 has been fed with the objects to be weighed from the feeding hopper 3 and can be used in next combination calculation, but the memory hopper 5 is empty and therefore cannot participate in a combination and be used in the next combination calculation. In a case where the weighing hopper 4 does not participate in a combination in the configuration of FIG. 9, when the accommodating chambers 5a and 5b of the memory hopper 5 are selected simultaneously to form a combination and discharge the objects to be weighed, one accommodating chamber (e.g., accommodating chamber 5a) has been fed with the objects to be weighed from the weighing hopper 4 and can be used in next combination calculation, but the accommodating chamber 5b is empty, and therefore cannot participate in a combination and be used in the next combination calculation. In a case where the weighing chambers 4a and 4b of the weighing hopper 4 in the configuration of FIG. 10 are selected simultaneously to form a combination and discharge the objects to be weighed, one weighing chamber (e.g., weighing chamber 4a) has been fed with the objects to be weighed from the feeding hopper 3 and can be used in next combination calculation, but the weighing chamber 4b is empty and therefore cannot participate in a combination and be used in the next combination calculation. In a case where the weighing hopper 4 in the configuration of FIG. 11 does not participate in the combination, if the accommodating chambers 5a and 5b of the memory hopper 5 are selected simultaneously to form the combination and discharge the objects to be weighed, the accommodating chambers 5a and 5b have been fed with the objects to be weighed from the weighing chambers 4a and 4b of the weighing hopper 4 and can be used in next combination calculation. In this case, one weighing chamber (e.g., weighing chamber 4a) has been fed with the objects to be weighed from the feeding hopper 3 but the other weighing chamber 4b is empty. Subsequently, when the accommodating chambers 5a and 5b of the same memory hopper 5 are selected simultaneously to form a combination and discharge the objects to be weighed, the accommodating chamber 5a has been fed with the objects to be weighed from the weighing chamber 4a and can be used in next combination calculation, but the accommodating chamber 5b corresponding to the weighing chamber 4b which was empty is empty, and therefore cannot participate in a combination and be used in the next combination calculation. The same applies to the configuration in which the two accommodating chambers 5a and 5b of each memory hopper 5 in FIGS. 9 and 11 are arranged in the direction in which a plurality of memory hoppers 5 are arranged, or to the configuration in which the two weighing chambers 4a and 4b of each weighing hopper 4 in FIG. 10 are arranged in the direction in which a plurality of weighing hoppers 4 are arranged.

For the configuration in which the hoppers or chambers which cannot be in some cases used in the combination calculation, discharge groups in the combination process may be determined as follows. In this case, after a discharge process, each discharge group may be determined based on target weight and the number of hoppers or chambers to be used in next combination calculation (the number of measured values which will participate in next combination calculation), thereafter, discharge path switching may be carried out for each discharge group determined, before the combination calculation in next combination process finishes and the combination calculation in the next combination process may be performed with respect to each of the discharge groups determined. In this case, each discharge group may be determined so that the number of the measured values that are to be allocated to participate in the next combination calculation is decided depending on the magnitudes of the target weights discharged from the respective discharge group. For example, if the target weights discharged from the respective discharge groups are equal, then the discharge groups are determined so that the number of measured values that will participate in next combination calculation are equal or substantially equal in the discharge groups. In this case, for example, one discharge candidate group set in which the number of measured values that will participate in next combination calculation in the respective discharge candidate groups are equal or substantially equal may be selected and a plurality of discharge candidate groups forming that discharge candidate group set may be determined as discharge groups. For example, in the configuration of FIG. 1, by moving the movable plates 10 to switch the discharge path of the adjustment groups, according to the determined discharge groups, the discharge process becomes possible immediately after the combination calculation. Therefore, time required to switch the discharge path of the adjustment group after the combination process finishes in the above described operation shown in FIG. 3 can be omitted, decreasing a discharge cycle.

The illustrated driving configuration of the movable plates 10 and 53 in the embodiments 1 and 4, the illustrated driving configuration of the movable chutes 21 and 56 in the embodiments 2 and 5, and the illustrated driving configuration of the collecting funnels (7A, 7B), (52A, 52B) in the embodiments 3 and 6 are exemplary, and other configurations may be used.

Furthermore, the control unit 20 in the embodiments 1 to 3 and the control unit 70 in the embodiments 4 to 6 are not limited to being configured as the single control apparatus, but instead may be configured to include a plurality of control apparatuses which are disposed in a distributed manner so as to co-operate to control the operation of the combination weigher.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention and all modifications which come within the scope of the appended claims are reserved.

INDUSTRIAL APPLICABILITY

A combination weigher of the present invention is useful as a combination weigher for feeding objects to be weighed to a plurality of packaging machines or a packaging machine operated at a high speed.

The invention claimed is:

1. A combination weigher comprising:
   a plurality of base groups and one or more adjustment groups into which a combination hopper chamber line formed by combination hopper chambers arranged in a line shape and fed with objects to be weighed is divided, each of the plurality of base groups being made up of a plurality of combination hopper chambers and the one or more adjustment groups being disposed between adjacent base groups and being made up of one or a plurality of combination hopper chambers;
   a discharge path switching chute which is disposed below the base groups and the adjustment groups and is provided at a lower part thereof with a plurality of outlets respectively corresponding to the base groups, the discharge path switching chute being configured to gather the objects to be weighed discharged from the combination hopper chambers of at least the base group corresponding to each outlet and to discharge the objects to be weighed from each outlet, and configured to switch a discharge path of the objects to be weighed discharged from the combination hopper chamber of each adjustment group so that the objects to be weighed discharged from the combination hopper chamber in each adjustment group are discharged selectively from one of the two outlets respectively corresponding to two base groups disposed at both sides of each adjustment group; and
   a control means configured to perform:
   a combination process including combining each adjustment group with one of the base groups at both sides thereof to re-divide the base groups and the adjustment groups into a plurality of discharge groups each including one base group and made up of a plurality of combination hopper chambers arranged continuously and performing combination calculation based on weights of the objects to be weighed fed into the combination hopper chambers in each discharge group to determine combination hopper chambers forming a combination in which a total weight of the objects to be weighed falls within an allowable range with respect to a target weight and a difference with respect to the target weight is smallest;
   a discharge path switching process for controlling the discharge path switching chute so that the objects to be weighed discharged from the combination hopper chambers of each adjustment group are discharged from the outlet corresponding to the base group included in the discharge group to which the adjustment group belongs; and
   a discharge process for causing the combination hopper chambers forming the combination determined in each discharge group to discharge the objects to be weighed.

2. The combination weigher according to claim 1, wherein the combination process performed by the control means is:
   to repeat plural times a series of processes to calculate a total of differences in each of discharge candidate group sets in which at least two discharge candidate groups are different, the series of processes including:
   a first process for combining each adjustment group with one of the base groups at both sides thereof to re-divide the base groups and the adjustment groups into a plurality of discharge candidate groups each including one base group and made up of a plurality of combination hopper chambers arranged continuously to determine the plurality of discharge candidate groups as one discharge candidate group set;
   a second process performed with respect to each of the discharge candidate groups in each discharge candidate group set in such a manner that the combination calculation is performed based on weights of the objects to be weighed fed into combination hopper chambers in each discharge candidate group to determine combination hopper chambers forming the combination in which the total weight of the objects to be weighed falls within the allowable range with respect to the target weight and the difference with respect to the target weight is smallest, to determine the total weight of the objects to be weighed in the combination hopper chambers forming the combination as an optimal combination weight of the discharge candidate group; and
   a third process for calculating a total of differences between optimal combination weights of the discharge candidate groups in each discharge candidate group set and the target weight; and
   to select a discharge candidate group set with a smallest total difference, from the discharge candidate group sets, and to determine discharge candidate groups in the discharge candidate group set with the smallest total difference as the discharge groups.

3. The combination weigher according to claim 2, wherein the number of the adjustment groups disposed between the base groups is k (k: integer of one or more);

wherein the first process in the combination process performed by the control means is to combine with each base group m (in: one integer from 0 to k) adjustment group present on a side of a first line direction in which the combination hopper chambers are arranged, and to combine with each base group (k-m) adjustment group present on a side of a second line direction opposite to the first line direction, to re-divide the base groups and the adjustment groups into the discharge candidate groups; and wherein a value of m is changed every time the series of processes including the first process is repeated.

4. The combination weigher according to claim 1, wherein the discharge path switching chute includes:

a collecting chute which is disposed below the base groups and the adjustment groups and is provided at a lower part thereof with a plurality of outlets respectively corresponding to the base groups, the collecting chute being configured to gather the objects to be weighed discharged from the combination hopper chambers of at least the base group corresponding to each outlet and to discharge the objects to be weighed from each outlet; and a movable plate which is configured to partition a space above the collecting chute to guide the objects to be weighed discharged from the combination hopper chambers of the adjustment group selectively to one of the two outlets respectively corresponding to the base groups at both sides of each adjustment group and is configured to be movable so that its partition position is changed;

wherein the control means is configured to control the movable plate to perform the discharge path switching process.

5. The combination weigher according to claim 1, wherein the discharge path switching chute includes:

a collecting chute which is disposed below the base groups and the adjustment groups and is provided at a lower part thereof with a plurality of outlets respectively corresponding to the base groups, the collecting chute being configured to gather the objects to be weighed discharged from the combination hopper chambers of at least the base group corresponding to each outlet and to discharge the objects to be weighed from each outlet; and a movable chute which is disposed above the collecting chute and below the adjustment groups and is configured to receive the objects to be weighed discharged from the combination hopper chambers of the adjustment group from an opening at an upper part thereof and to discharge the objects to be weighed from a feed outlet at a lower end thereof, the movable chute being movable to cause each feed outlet to be directed toward one of the two outlets respectively corresponding to the base groups at both sides of each adjustment group;

wherein the control means is configured to control the movable chute to perform the discharge path switching process.

6. The combination weigher according to claim 1, wherein the discharge path switching chute includes:

an upper chute which is disposed below the base groups and the adjustment groups and is configured to gather the objects to be weighed discharged from the combination hopper chambers and to feed out the objects to be weighed from an opening provided at a lower part thereof;

a lower chute having a plurality of funnel regions which are respectively provided at lower parts thereof with outlets respectively corresponding to the base groups and are configured to receive the objects to be weighed discharged from the combination hopper chambers of at least the base group and fed out from the opening of the upper chute and to discharge the objects to be weighed from the outlets, the plurality of funnel regions being movable together in a direction in which the plurality of combination hopper chambers are arranged; and a guide plate configured to guide the objects to be weighed discharged from the combination hopper chambers of the adjustment group from above the upper chute to the funnel region provided with the outlet corresponding to the base group included in the discharge group to which the adjustment group belongs;

wherein the control means is configured to control the lower chute to perform the discharge path switching process.

7. The combination weigher according to claim 6, wherein the guide plate is a separating plate which is fastened to the upper chute, for partitioning a region of the upper chute through which the objects to be weighed discharged from the combination hopper chambers of the adjustment group travel to guide the objects to be weighed discharged from the combination hopper chambers of the adjustment group to a predetermined region of the opening of the upper chute.

8. The combination weigher according to claim 6, wherein the guide plate is a separating plate which is fastened onto a boundary between the funnel regions of the lower chute to extend from the boundary upward above the upper chute, the separating plate being movable with the funnel regions so as to move along a chute surface of the upper chute, thereby separating a traveling path inside the upper chute for the objects to be weighed discharged from the combination hopper chambers of each of adjacent discharge groups.

9. The combination weigher according to claim 1, wherein the combination hopper chambers are weighing chambers of weighing hoppers each consisting of one weighing chamber fed with the objects to be weighed whose weight is measured.

10. The combination weigher according to claim 1, wherein two combination hopper chamber lines are arranged in upper and lower positions, wherein the combination hopper chambers in the upper combination hopper chamber line are weighing chambers of each weighing hopper consisting of one weighing chamber fed with the objects to be weighed whose weight is measured, and the combination hopper chambers in the lower combination hopper chamber line are accommodating chambers of each memory hopper which are provided to respectively correspond to the weighing chambers, the memory hoppers each consisting of one accommodating chamber fed with the objects to be weighed measured in the weighing chamber; wherein the weighing chambers are each configured to discharge the objects to be weighed selectively to a corresponding accommodating chamber or to the discharge path switching chute; and wherein the adjustment group is made up of one set or plural sets of corresponding weighing chamber and accommodating chamber.

11. The combination weigher according to claim 1, wherein two combination hopper chamber lines are arranged horizontally and the combination hopper chambers in the two combination hopper chamber lines are disposed to form a pair;

wherein the combination hopper chambers forming the pair in the two combination hopper chamber lines are two accommodating chambers of each memory hopper having two accommodating chambers;

and wherein a weighing chamber of a weighing hopper is disposed above the two accommodating chambers of each memory hopper, the weighing hopper consisting of one weighing chamber which is fed with the objects to be weighed whose weight is measured and is configured to discharge the objects to be weighed selectively to one of the two accommodating chambers;

and wherein the adjustment group is made up of one set or plural sets of the two accommodating chambers of the memory hopper.

12. The combination weigher according to claim 1, wherein two combination hopper chamber lines are arranged horizontally, and the combination hopper chambers in the two combination hopper chamber lines are disposed to form a pair;

wherein the combination hopper chambers forming the pair in the two combination hopper chamber lines are two weighing chambers of each weighing hopper having two weighing chambers fed with the objects to be weighed whose weights are measured;

and wherein the adjustment group is made up of one set or plural sets of the two weighing chambers of the weighing hopper.

13. The combination weigher according to claim 1, wherein two combination hopper chamber lines are arranged horizontally, and the combination hopper chambers in the two combination hopper chamber lines are disposed to form a pair; wherein the combination hopper chambers forming the pair in the two combination hopper chamber lines are two accommodating chambers of each memory hopper having two accommodating chambers; wherein two weighing chambers of each weighing hopper are disposed above the two accommodating chambers of each memory hopper to respectively correspond to the accommodating chambers, the weighing hopper having two weighing chambers which are fed with the objects to be weighed whose weights are measured and are each configured to discharge the objects to be weighed to a corresponding accommodating chamber; and wherein the adjustment group is made up of one set or plural sets of the two accommodating chambers of the memory hopper.

14. The combination weigher according to claim 1, wherein the combination hopper chamber line is configured such that adjacent two combination hopper chambers form a pair, and the combination hopper chambers forming the pair are two accommodating chambers of each memory hopper having two accommodating chambers;

wherein a weighing chamber of a weighing hopper is disposed above the two accommodating chambers of each memory hopper, the weighing hopper consisting of one weighing chamber which is fed with the objects to be weighed whose weight is measured and is configured to discharge the objects to be weighed selectively to one of the two accommodating chambers; and wherein the adjustment group is made up of one accommodating chamber of the memory hopper.

15. The combination weigher according to claim 1, wherein the combination hopper chamber line is configured such that adjacent two combination hopper chambers form a pair, and the combination hopper chambers forming the pair are two weighing chambers of each weighing hopper having two weighing chambers which are fed with the objects to be weighed whose weights are measured; and wherein the adjustment group is made up of one weighing chamber of the weighing hopper.

16. The combination weigher according to claim 1, wherein the combination hopper chamber line is configured such that adjacent two combination hopper chambers form a pair, and the combination hopper chambers forming the pair are two accommodating chambers of each memory hopper having two accommodating chambers;

wherein two weighing chambers of a weighing hopper are disposed above the two accommodating chambers of each memory hopper to respectively correspond to the accommodating chambers, the weighing hopper having two weighing chambers which are fed with the objects to be weighed whose weights are measured and are each configured to discharge the objects to be weighed to a corresponding accommodating chamber;

and wherein the adjustment group is made up of one accommodating chamber of the memory hopper.

17. The combination weigher according to claim 1, wherein two combination hopper chamber lines are arranged in upper and lower positions, wherein the combination hopper chambers in the upper combination hopper chamber line are weighing chambers of each weighing hopper consisting of one weighing chamber fed with the objects to be weighed whose weight is measured, and the combination hopper chambers in the lower combination hopper chamber line are accommodating chambers of each memory hopper which are provided to respectively correspond to the weighing chambers, the memory hoppers each consisting of one accommodating chamber fed with the objects to be weighed measured in the weighing chamber; wherein the weighing chambers are each configured to discharge the objects to be weighed selectively to a corresponding accommodating chamber or to the discharge path switching chute; wherein the adjustment group is made up of one set or plural sets of corresponding weighing chamber and accommodating chamber; wherein a plurality of feeding means are disposed above the weighing hoppers to respectively correspond to the weighing hoppers and are each configured to feed the objects to be weighed to a weighing chamber of a corresponding weighing hopper;

wherein the plurality of feeding means are each configured to feed the objects to be weighed only once to the weighing chamber of the corresponding weighing hopper in a time period from combination calculation in current combination process to combination calculation in next combination process when the control means repeats the combination process and the discharge process;

and wherein the control means is configured to find combination hopper chambers which are to be fed with the objects to be weighed and are to be used in combination calculation at a time point when the combination calculation in the next combination process is performed and to determine the discharge groups based on target weight and the number of combination hopper chambers for which the combination calculation is to be performed, after the discharge process, to thereafter perform the discharge path switching process according to the determined discharge groups before the combination calculation in the next combination process finishes and to perform the combination calculation in the next combination process with respect to each of the determined discharge groups.

18. The combination weigher according to claim 1, wherein
two combination hopper chamber lines are arranged horizontally and the combination hopper chambers in the two combination hopper chamber lines are disposed to form a pair;
wherein the combination hopper chambers forming the pair in the two combination hopper chamber lines are two accommodating chambers of each memory hopper having two accommodating chambers;
wherein a weighing chamber of a weighing hopper is disposed above the two accommodating chambers of each memory hopper, the weighing hopper consisting of one weighing chamber which is fed with the objects to be weighed whose weight is measured and is configured to discharge the objects to be weighed selectively to one of the two accommodating chambers;
wherein the adjustment group is made up of one set or plural sets of the two accommodating chambers of the memory hopper;
wherein the weighing chamber of each weighing hopper is configured to feed the objects to be weighed to one of the two accommodating chambers of the memory hopper in a time period from combination calculation in current combination process to combination calculation in next combination process when the control means repeats the combination process and the discharge process;
and wherein the control means is configured to find combination hopper chambers which are to be fed with the objects to be weighed and are to be used in combination calculation at a time point when the combination calculation in the next combination process is performed and to determine the discharge groups based on target weight and the number of combination hopper chambers for which the combination calculation is to be performed, after the discharge process, to thereafter perform the discharge path switching process according to the determined discharge groups before the combination calculation in the next combination process finishes and to perform the combination calculation in the next combination process with respect to each of the determined discharge groups.

19. The combination weigher according to claim 1, wherein
two combination hopper chamber lines are arranged horizontally and the combination hopper chambers in the two combination hopper chamber lines are disposed to form a pair;
wherein the combination hopper chambers forming the pair in the two combination hopper chamber lines are two weighing chambers of each weighing hopper having two weighing chambers which are fed with the objects to be weighed whose weights are measured;
wherein the adjustment group is made up of one set or plural sets of the two weighing chambers of the weighing hopper;
wherein a plurality of feeding means are disposed above the weighing hoppers to respectively correspond to the weighing hoppers and are each configured to feed the objects to be weighed selectively to one of the weighing chambers of a corresponding weighing hopper,
wherein the plurality of feeding means are each configured to feed the objects to be weighed to one of the two weighing chambers of the corresponding weighing hopper in a time period from combination calculation in current combination process to combination calculation in next combination process when the control means repeats the combination process and the discharge process;
and wherein the control means is configured to find combination hopper chambers which are to be fed with the objects to be weighed and are to be used in combination calculation at a time point when the combination calculation in the next combination process is performed and to determine the discharge groups based on target weight and the number of combination hopper chambers for which the combination calculation is to be performed, after the discharge process, to thereafter perform the discharge path switching process according to the determined discharge groups before the combination calculation in the next combination process finishes and to perform the combination calculation in the next combination process with respect to each of the determined discharge groups.

20. The combination weigher according to claim 1, wherein
two combination hopper chamber lines are arranged horizontally and the combination hopper chambers in the two combination hopper chamber lines are disposed to form a pair;
wherein the combination hopper chambers forming the pair in the two combination hopper chamber lines are two accommodating chambers of each memory hopper having two accommodating chambers;
two weighing chambers of each weighing hopper are disposed above the two accommodating chambers of each memory hopper to respectively correspond to the accommodating chambers, the weighing hopper having two weighing chambers which are fed with the objects to be weighed whose weights are measured and are each configured to discharge the objects to be weighed to a corresponding accommodating chamber;
wherein the adjustment group is made up of one set or plural sets of the two accommodating chambers of the memory hopper;
a plurality of feeding means are disposed above the weighing hoppers to respectively correspond to the weighing hoppers and are each configured to feed the objects to be weighed selectively to one of the two weighing chambers of a corresponding weighing hopper;
wherein the plurality of feeding means are each configured to feed the objects to be weighed to one of the weighing chambers of the corresponding weighing hopper in a time period from combination calculation in current combination process to combination calculation in next combination process when the control means repeats the combination process and the discharge process;
and wherein the control means is configured to find combination hopper chambers which are to be fed with the objects to be weighed and are to be used in combination calculation at a time point when the combination calculation in the next combination process is performed and to determine the discharge groups based on target weight and the number of combination hopper chambers for which the combination calculation is to be performed, after the discharge process, to thereafter perform the discharge path switching process according to the determined discharge groups before the combination calculation in the next combination process finishes and to perform the combination calculation in the next combination process with respect to each of the determined discharge groups.

21. The combination weigher according to claim 1, wherein the combination hopper chamber line is configured such that adjacent two combination hopper chambers form a pair, and the combination hopper chambers forming the pair are two chambers of each hopper having two chambers;

wherein the adjustment group is made up of one chamber of the hopper;

wherein when the control means repeats the combination process and the discharge process, the objects to be weighed are fed to one of the two chambers of the hopper in a time period from when the two chambers of the hopper are selected simultaneously by combination calculation in one combination process or combination calculation in two sequential combination processes until when combination calculation in next combination process is performed;

and wherein the control means is configured to find combination hopper chambers which are to be fed with the objects to be weighed and are to be used in combination calculation at a time point when the combination calculation in the next combination process is performed and determine the discharge groups based on target weight and the number of combination hoppers for which the combination calculation is to be performed, after the discharge process, to thereafter perform the discharge path switching process according to the determined discharge groups before the combination calculation in the next combination process finishes and to perform the combination calculation in the next combination process with respect to each of the determined discharge groups.

22. The combination weigher according to claim 1, wherein the control means is configured to perform the discharge process with respect to the discharge groups simultaneously.

23. The combination weigher according to claim 1, wherein the combination hopper chamber line is formed by the combination hopper chambers arranged circularly.

24. The combination weigher according to claim 1, wherein the combination hopper chamber line is formed by the combination hopper chambers arranged in a straight line shape.

25. The combination weigher according to claim 1, wherein target weights of the objects to be weighed discharged from the outlets of the discharge path switching chute are different from each other, and the number of combination hopper chambers forming the base group corresponding to each outlet is increased or decreased according to a magnitude of the target weight of the objects to be weighed discharged from each outlet.

26. The combination weigher according to claim 1, configured to discharge the objects to be weighed discharged from a plurality of outlets of the discharge path switching chute to inlets of a plurality of packaging machines disposed to respectively correspond to the outlets.

27. The combination weigher according to claim 1, further comprising:

a plurality of collecting hoppers which are respectively provided at the outlets of the discharge path switching chute and are configured to hold the objects to be weighed discharged from the outlets and to discharge the objects to be weighed to the same inlet of a packaging machine; wherein the control means is configured to sequentially select the plurality of collecting hoppers to discharge the objects to be weighed to the inlet of the packaging machine.

28. A combination weigher for processing items to be weighed and comprising:

a combination hopper chamber line formed by a plurality of combination hopper chambers arranged in a line shape and divided into first and second base groups and an adjustment group disposed between the base groups;

the first and second base groups each formed of a plurality of the combination hopper chambers, and the adjustment group disposed between adjacent base groups and formed of at least one combination hopper chamber;

a discharge path switching chute disposed below the first and second base groups and the adjustment group, the discharge path switching chute having a lower portion having a plurality of outlets, each outlet associated with a corresponding one of the first or second base groups, the switching chute positioned to receive the objects from the corresponding base group and to discharge the objects from the outlet associated with the corresponding base group, the switching chute configured to switch a discharge path of the objects discharged from the adjustment group so that the objects discharged from the adjustment group may be discharged from the outlet associated with either the first base group or the second base group; and a control means, the control means configured to perform:

a combination process including combining the adjustment group with the first or second base group to re-divide the base groups and the adjustment group into a plurality of discharge groups, each discharge group including a selected one of the first base group or the second base group and made up of a plurality of combination hopper chambers arranged continuously and performing combination calculation based on weights of the objects fed into the combination hopper chambers in each discharge group to determine combination hopper chambers forming a combination in which a total weight of the objects falls within an allowable range with respect to a target weight and a difference with respect to the target weight is smallest;

a discharge path switching process for controlling the discharge path switching chute so that the objects discharged from the combination hopper chambers of each adjustment group are discharged from the outlet corresponding to selected base group included in the discharge group to which the adjustment group belongs; and a discharge process for causing the combination hopper chambers forming the combination determined in each discharge group to discharge the objects.

* * * * *